United States Patent
Bok et al.

(10) Patent No.: US 11,816,916 B2
(45) Date of Patent: Nov. 14, 2023

(54) ELECTRONIC DEVICE

(71) Applicant: Samsung Display Co., Ltd., Yongin-Si (KR)

(72) Inventors: Seung-Lyong Bok, Hwaseong-si (KR); Kicheol Kim, Yongin-si (KR); Jongin Baek, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 53 days.

(21) Appl. No.: 17/318,214

(22) Filed: May 12, 2021

(65) Prior Publication Data

US 2022/0058358 A1    Feb. 24, 2022

(30) Foreign Application Priority Data

Aug. 18, 2020   (KR) .................. 10-2020-0103391

(51) Int. Cl.
| | |
|---|---|
| *G06V 40/13* | (2022.01) |
| *G06F 3/044* | (2006.01) |
| *G06F 3/041* | (2006.01) |

(52) U.S. Cl.
CPC ........ *G06V 40/1306* (2022.01); *G06F 3/0412* (2013.01); *G06F 3/0443* (2019.05); *G06F 3/0445* (2019.05); *G06F 3/0446* (2019.05); *G06F 2203/04102* (2013.01)

(58) Field of Classification Search
CPC . G06V 40/1306; G06F 3/0412; G06F 3/0443; G06F 3/0445; G06F 3/0446; G06F 2203/04102; G06F 3/04166; G06F 2203/04111; G06F 2203/04112; G09F 9/30; G09F 9/301; H01L 27/3227; H01L 27/3225; H01L 27/3276; H01L 51/5246; H01L 2251/5338
See application file for complete search history.

(56) References Cited

U.S. PATENT DOCUMENTS

| | | |
|---|---|---|
| 6,454,414 B1 | 9/2002 | Ting |
| 7,663,607 B2 | 2/2010 | Hotelling et al. |
| 8,390,582 B2 | 3/2013 | Hotelling et al. |
| 9,081,453 B2 | 7/2015 | Bulea et al. |
| 10,185,430 B2 | 1/2019 | Zhu et al. |
| 10,338,712 B2 | 7/2019 | Bok et al. |
| 10,359,882 B2 | 7/2019 | Kim |

(Continued)

FOREIGN PATENT DOCUMENTS

| | | |
|---|---|---|
| JP | 6603544 | 11/2019 |
| KR | 10-2013-0057637 | 6/2013 |

(Continued)

*Primary Examiner* — Jonathan A Boyd
(74) *Attorney, Agent, or Firm* — F. Chau & Associates, LLC

(57) ABSTRACT

The present application relates to an electronic device. The electronic device includes a display panel. A window is disposed on the display panel. An input sensor is disposed between the display panel and the window. The input sensor includes a first sensing electrode extending in a first direction and a second sensing electrode extending in a second direction crossing the first direction. At least a partial portion of each of the first sensing electrode and the second sensing electrode includes a plurality of fine sensing electrodes that is configured to be a fingerprint sensor.

21 Claims, 25 Drawing Sheets

(56) References Cited

U.S. PATENT DOCUMENTS

| | | |
|---|---|---|
| 10,592,037 B2 | 3/2020 | Noguchi |
| 2013/0135247 A1 | 5/2013 | Na et al. |
| 2016/0202831 A1* | 7/2016 | Kim ..................... G06F 3/0446 |
| | | 345/173 |
| 2018/0157357 A1 | 6/2018 | Lin et al. |
| 2018/0260071 A1* | 9/2018 | Kim ................... G06V 40/1306 |
| 2019/0004640 A1 | 1/2019 | Ye |

FOREIGN PATENT DOCUMENTS

| | | |
|---|---|---|
| KR | 10-1432988 | 8/2014 |
| KR | 10-1473184 | 12/2014 |
| KR | 10-1474733 | 12/2014 |
| KR | 10-1493494 | 2/2015 |
| KR | 10-2016-0033328 | 3/2016 |
| KR | 10-1634642 | 6/2016 |
| KR | 10-2017-0050060 | 5/2017 |
| KR | 10-2018-0027467 | 3/2018 |

\* cited by examiner

ELECTRONIC DEVICE

CROSS-REFERENCE TO RELATED APPLICATION

This application claims priority to Korean Patent Application No. 10-2020-0103391, filed on Aug. 18, 2020 in the Korean Intellectual Property Office, the disclosure of which is incorporated by reference in its entirety herein.

TECHNICAL FIELD

The present inventive concepts relate to an electronic device. More particularly, the present inventive concepts relate to an electronic device including a fingerprint sensor disposed over an entire display area.

DISCUSSION OF RELATED ART

Electronic devices are being manufactured to include an increasing variety of functions in addition to an image display function. One example is an electronic device including a fingerprint sensor. The fingerprint sensor may utilize various methods for recognizing a fingerprint, such as a capacitive method, an optical method, a thermal method or an ultrasonic method. The capacitive method is a method of recognizing a fingerprint using a difference in capacitance according to a distance between ridges of the fingerprint, between valleys of the fingerprint, or between the ridge and the valley of the fingerprint after placing sensing electrodes very closely to each other.

SUMMARY

The present inventive concepts provide an electronic device including a fingerprint sensor operated over an entire display area thereof.

According to an embodiment of the present inventive concepts, an electronic device includes a display panel. A window is disposed on the display panel. An input sensor is disposed between the display panel and the window. The input sensor includes a first sensing electrode extending in a first direction and a second sensing electrode extending in a second direction crossing the first direction. At least a partial portion of each of the first sensing electrode and the second sensing electrode includes a plurality of fine sensing electrodes that is configured to be a fingerprint sensor.

In a embodiment, the thin film glass has a thickness equal to or smaller than about 30 micrometers.

In a embodiment, the display panel includes a thin film encapsulation layer, and the input sensor is disposed directly on the thin film encapsulation layer.

In an embodiment, the display panel is a flexible display panel including a folding area and a non-folding area adjacent to the folding area.

In an embodiment, some of the fine sensing electrodes overlap the folding area.

In an embodiment, the input sensor further includes a first insulating layer disposed on the display panel and a second insulating layer disposed on the first insulating layer. The second sensing electrode is disposed on the first insulating layer, and the first sensing electrode is disposed on the second insulating layer.

In an embodiment, the second insulating layer has a thickness greater than a thickness of the first insulating layer.

In an embodiment, the first sensing electrode and the second sensing electrode include a plurality of mesh lines.

In an embodiment, the input sensor includes a first signal line electrically connected to the first sensing electrode and a second signal line electrically connected to the second sensing electrode, and at least a portion of each of the first signal line and the second signal line includes a plurality of fine signal lines respectively connected to the fine sensing electrodes.

In an embodiment, the electronic device further includes a plurality of multiplexers respectively connected to the fine signal lines.

In an embodiment, the multiplexers include a plurality of first multiplexers connected to the fine electrode patterns through the fine signal lines and a second multiplexer connected to the first multiplexers, and the second multiplexer is connected to a driving circuit that controls an operation of the input sensor and the fingerprint sensor.

In an embodiment, the input sensor includes a touch sensing area and a fingerprint sensing area defined by the first sensing electrode and the second sensing electrode, and the fingerprint sensing area is defined by the fine sensing electrodes that cross each other.

In an embodiment, a half of the first sensing electrode includes a plurality of first fine sensing electrodes, a half of the second sensing electrode includes a plurality of second fine sensing electrodes, and the first fine sensing electrodes cross the second fine sensing electrodes.

According to an embodiment of the present inventive concepts, an electronic device includes a display panel. A first insulating layer is disposed on the display panel. A second insulating layer is disposed on the first insulating layer. An input sensor is disposed directly on the second insulating layer and includes a first sensing electrode extending in a first direction and a second sensing electrode extending in a second direction crossing the first direction. At least a partial portion of each of the first sensing electrode and the second sensing electrode includes a plurality of fine sensing electrodes that is configured to be a fingerprint sensor.

In an embodiment, the fingerprint sensor is operated in a capacitive method.

In an embodiment, at least a portion of the first sensing electrode includes a plurality of first fine sensing electrodes, at least a portion of the second sensing electrode includes a plurality of second fine sensing electrodes, and the fingerprint sensor includes the first fine sensing electrodes and the second fine sensing electrodes that cross each other.

In an embodiment, each of the fine sensing electrodes has a width that is substantially the same as a distance between ridges of a fingerprint.

In an embodiment, the first sensing electrode has an area that is substantially the same as a sum of areas of the fine sensing electrodes included in the first sensing electrode.

In an embodiment, the first sensing electrode and the second sensing electrode are operated as a touch sensor which senses a touch input in the input sensor, a half of each of the first sensing electrode and the second sensing electrode is operated as both the touch sensor and the fingerprint sensor, and the fingerprint sensor includes the fine sensing electrodes that cross each other.

According to an embodiment of the present inventive concepts, an electronic device includes a display panel. A window is disposed on the display panel and includes a thin film glass. An input sensor is disposed between the display panel and the window. The input sensor includes a plurality of sensing electrodes. A plurality of signal lines is respectively connected to the plurality of sensing electrodes. A plurality of multiplexers connects the plurality of signal lines. At least a partial portion of the plurality of sensing electrodes comprises a plurality of fine sensing electrodes that is configured to be a fingerprint sensor.

According to an embodiment of the present inventive concepts, an electronic device includes a display panel. A window is disposed on the display panel. An input sensor is disposed between the display panel and the window. The input sensor includes a first sensing electrode extending in a first direction and a second sensing electrode extending in a second direction crossing the first direction. A partial portion of the first sensing electrode and the second sensing electrode includes a plurality of fine sensing electrodes having a first width and a remaining portion of the first sensing electrode and the second sensing electrode includes sensing electrodes have a second width in a range of about twenty to about forty times greater than the first width.

According to the above, the electronic device includes the fingerprint sensor operated over an entire display area thereof, and it is able to apply the fingerprint sensor to a foldable product since the fingerprint sensor is operated with the capacitive method.

BRIEF DESCRIPTION OF THE DRAWINGS

The above and other features of the present inventive concepts will become readily apparent by reference to the following detailed description when considered in conjunction with the accompanying drawings wherein.

DETAILED DESCRIPTION OF EMBODIMENTS

Figure 1:
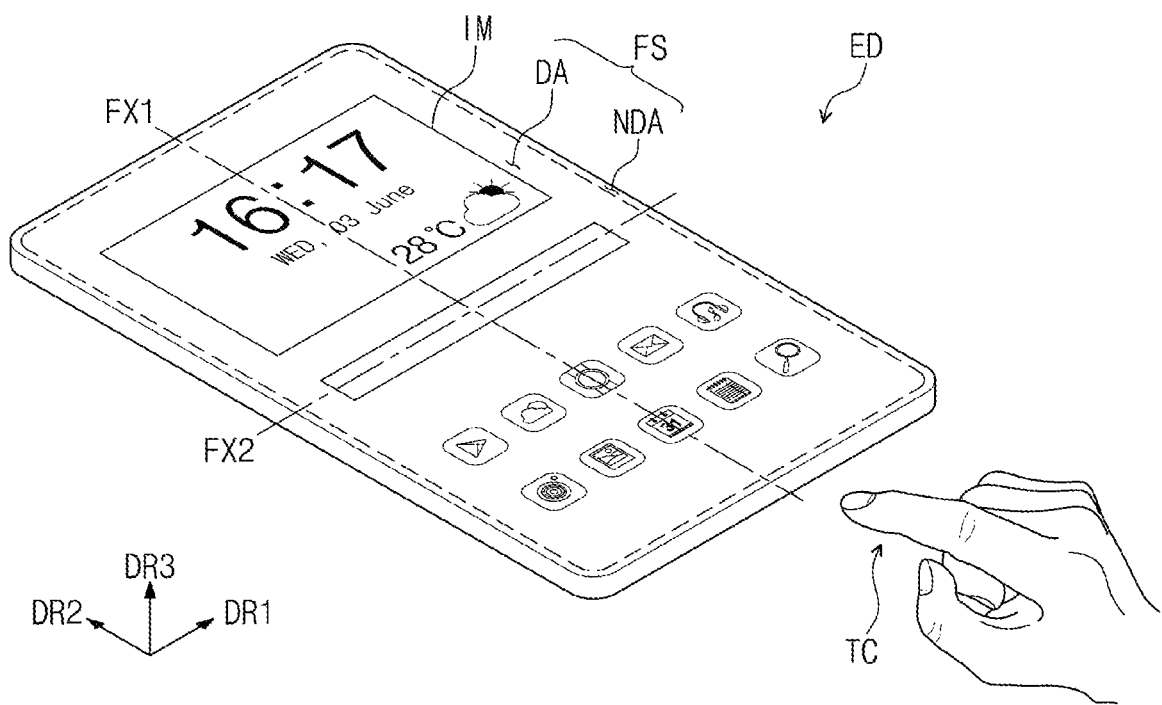
FIG. 1 is a perspective view showing an electronic device according to an embodiment of the present inventive concepts.

In the present disclosure, it will be understood that when an element or layer is referred to as being "on", "connected to" or "coupled to" another element or layer, it can be directly on, connected or coupled to the other element or layer or intervening elements or layers may be present. When an element or layer is referred to as being "directly on", "directly connected to" or "directly coupled to" another element or layer, no intervening elements or layers may be present.

Like numerals refer to like elements throughout. In the drawings, the thickness, ratio, and dimension of components may be exaggerated for convenience of explanation. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present inventive concepts will be explained in detail with reference to the accompanying drawings.

FIG. 1 is a perspective view showing an electronic device ED according to an embodiment of the present inventive concepts.

Referring to the embodiment of FIG. 1, the electronic device ED has a rectangular shape with relatively shorter sides in a first direction DR1 and relatively longer sides in a second direction DR2 crossing the first direction DR1 For example, the second direction DR2 may be perpendicular to the first direction DR1. However, embodiments of the present inventive concepts are not limited. Furthermore, the electronic device ED may have a variety of shapes and is not limited to the rectangular shape.

In an embodiment, the electronic device ED may be a foldable electronic device. For example, in an embodiment, the electronic device ED may be folded about first and second folding axes FX1 and FX2 extending in a predetermined direction. However, embodiments of the present inventive concepts are not limited thereto and the number of folding axes may vary and the folding axes may extend in various different predetermined directions. Hereinafter, a state in which the electronic device ED is not folded is referred to as a "first state, e.g., non-folding state", and a state in which the electronic device ED is folded about the first and second folding axes FX1 and FX2 is referred to as a "second state, e.g., folding state". The first and second folding axes FX1 and FX2 may be rotational axes generated when the electronic device ED is folded, and the folding axes FX1 and FX2 may be formed by the structures of components of the electronic device ED.

In an embodiment, the first and second folding axes FX1 and FX2 may extend in the first direction DR1 or the second direction DR2. For example, in an embodiment, the first folding axis FX1 is the folding axis extending in the second direction DR2 and the second folding axis FX2 is the folding axis extending in the first direction DR1. In an embodiment, the electronic device ED may include only one folding axis of the first and second folding axes FX1 and FX2. For example, in this embodiment, the electronic device ED may be folded about one of the first and second folding axes FX1 and FX2.

The electronic device ED according an embodiment of the present inventive concepts may be applied to a large-sized electronic item, such as a television set and a monitor, and small and medium-sized electronic items, such as a mobile phone, a tablet computer, a car navigation unit, and a game unit. However, embodiments of the present inventive concepts are not limited thereto and the electronic device ED may be applied to various other electronic items.

As shown in the embodiment of FIG. 1, the electronic device ED may display an image IM on a display surface FS that extends in a plane defined in the first and second directions DR1 and DR2. The image IM is displayed towards a third direction DR3 which is a thickness direction of the electronic device ED and crosses the first and second directions DR1 and DR2. For example, as shown in the embodiment of FIG. 1, the third direction DR3 may be perpendicular to the first and second directions DR1 and DR2. However, embodiments of the present inventive concepts are not limited thereto. The display surface FS on which the image IM is displayed may correspond to a front surface of the electronic device ED. As shown in the embodiment of FIG. 1, the image IM may be a clock, calendar and weather display window and a plurality of software application icons. However, embodiments of the present inventive concepts are not limited thereto and the image IM may be one or more still or moving images of various different subject matter.

The display surface FS of the electronic device ED may be divided into a plurality of areas. The display surface FS of the electronic device ED may include a display area DA and a non-display area NDA, which are defined therein.

The display area DA may be an area in which the image IM is displayed, and a user may view the image IM through the display area DA. In an embodiment, the display area DA may have a quadrangular shape. The non-display area NDA may surround the display area DA. For example, in an embodiment, the non-display area NDA may completely surround the display area DA (e.g., in the first and second directions DR1 and DR2). Accordingly, the display area DA may have a shape defined by the non-display area NDA. However, embodiments of the present inventive concepts are not limited thereto and the non-display area NDA may not be disposed adjacent to one or more sides of the display area DA or may be omitted. The electronic device ED according to embodiments of the present inventive concepts may include various embodiments, and it should not be limited to a particular embodiment.

The non-display area NDA is an area adjacent to the display area DA, and the image IM is not displayed through the non-display area NDA. The electronic device ED includes a bezel area defined by the non-display area NDA.

The electronic device ED according to an embodiment of the present inventive concepts may sense a user input TC applied thereto from the outside. The user input TC includes various forms of external inputs, such as a portion of the user's body, light, heat, or pressure. In the embodiment shown in FIG. 1, the user input TC is shown as a user's hand applied to the front surface. However, embodiments of the present inventive concepts are not limited thereto. The user input TC may be provided in various forms as described above, the electronic device ED may sense the user input TC applied to a side or rear surface of the electronic device ED depending on a structure of the electronic device ED, and the present inventive concepts should not be limited to a particular embodiment.

The electronic device ED may activate the display surface FS to display the image IM while sensing the user input TC. As shown in the embodiment of FIG. 1, an area where the user input TC is sensed may be defined in the display area DA in which the image IM is displayed. However, embodiments of the present inventive concepts are not limited thereto and the area where the user input TC is sensed may be defined in the non-display area NDA, may be defined in partial portions of the non-display area NDA and/or the display area DA or may be defined over the entire display surface FS.

Figure 2A:
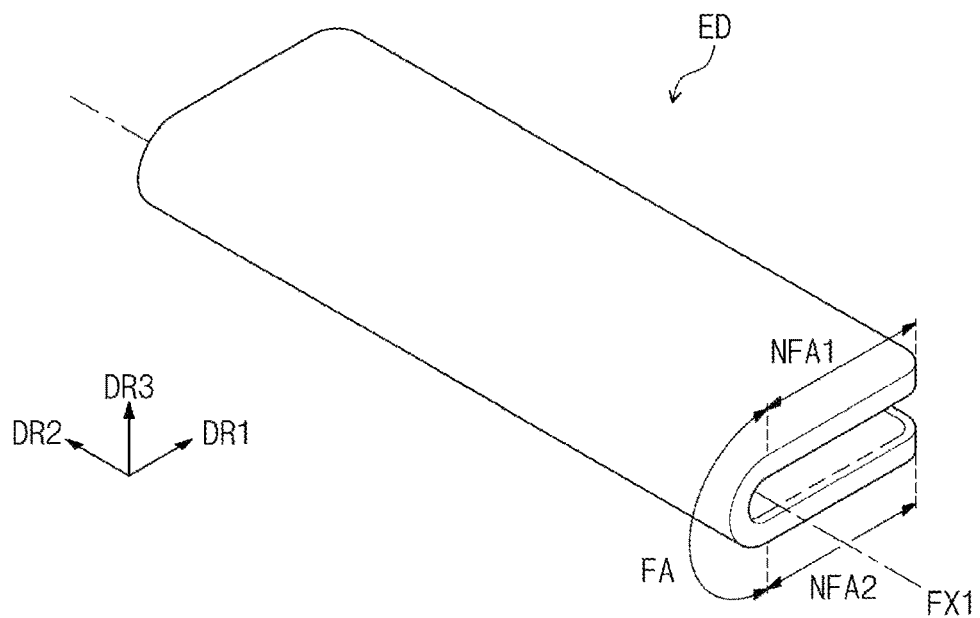
FIG. 2A is a perspective view showing a state in which the electronic device shown in FIG. 1 is inwardly folded (in-folding) about a first folding axis according to an embodiment of the present inventive concepts.
Figure 2B:
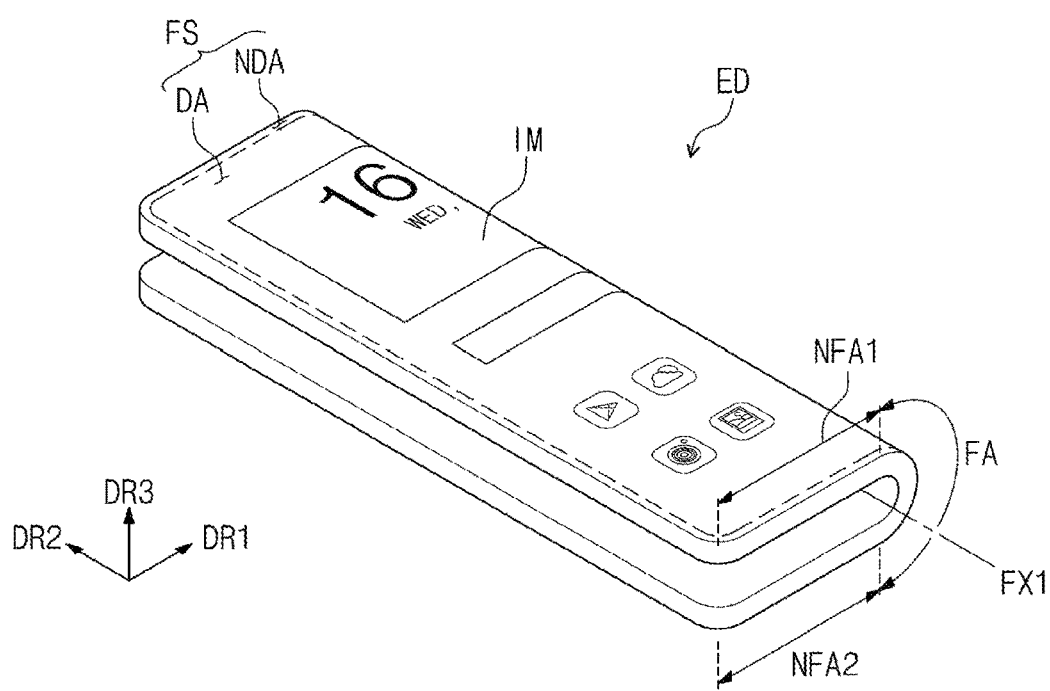
FIG. 2B is a perspective view showing a state in which the electronic device shown in FIG. 1 is outwardly folded (out-folding) about the first folding axis according to an embodiment of the present inventive concepts.

FIG. 2A is a perspective view showing a state in which the electronic device ED shown in FIG. 1 is inwardly folded (in-folding) about the first folding axis FX1, and FIG. 2B is a perspective view showing a state in which the electronic device ED shown in FIG. 1 is outwardly folded (out-folding) about the first folding axis FX1.

Referring to the embodiments of FIGS. 1 and 2A, the electronic device ED may be the foldable electronic device. The electronic device ED may be folded about a folding axis, such as the first folding axis FX1, extending in the predetermined direction.

The electronic device ED may include a plurality of areas defined therein according to its operation mode. The areas may include a folding area FA and at least one non-folding area, such as the first and second non-folding areas NFA1 and NFA2. The folding area FA may be defined between the first and second non-folding areas NFA1 and NFA2.

The folding area FA is folded about the first folding axis FX1 to form a curvature. As shown in the embodiment of FIG. 2A, the first folding axis FX1 may extend in the second direction DR2, such as a major axis direction of the electronic device ED. The folding area FA may be folded about the first folding axis FX1 and may extend in the second direction DR2.

As an example, the non-folding areas may include the first non-folding area NFA1 and the second non-folding area NFA2. The first non-folding area NFA1 is disposed adjacent to a first side of the folding area FA in the first direction DR1, and the second non-folding area NFA2 is disposed adjacent to the opposite second side of the folding area FA in the first direction DR1.

The electronic device ED may be inwardly folded (in-folding) or outwardly folded (out-folding). A folding state in which the electronic device ED is folded to allow display surfaces FS of different non-folding areas, such as the first and second non-folding areas NFA1 and NFA2, to face each other is defined as in-folding, and a folding state in which the electronic device ED is folded to allow the display surfaces FS of different non-folding areas, such as the first and second non-folding areas NFA1 and NFA2, to face the outside is defined as out-folding.

The in-folding indicates a state in which the electronic device ED is folded to allow a portion of the display surface FS to face the other portion of the display surface FS. The out-folding indicates a state in which the electronic device ED is folded to allow a portion of the rear surface to face the other portion of the rear surface.

The electronic device ED shown in the embodiment of FIG. 2A may be inwardly folded (in-folding) to allow the display surface FS of the first non-folding area NFA1 to face the display surface FS of the second non-folding area NFA2. As the first non-folding area NFA1 rotates in a clockwise direction about the first folding axis FX1, the electronic device ED may be inwardly folded. As shown in the embodiment of FIG. 2A, the first folding axis FX1 may be defined at a center of the electronic device ED in the first direction DR1 to inwardly fold the electronic device ED such that the first non-folding area NFA1 and the second non-folding area NFA2 are aligned with each other. However, embodiments of the present inventive concepts are not limited thereto and the first folding axis FX1 may be positioned in various different portions of the electronic device ED.

Referring to the embodiment of FIG. 2B, the electronic device ED may be outwardly folded (out-folding) about the first folding axis FX1. The electronic device ED may display the image IM when the display surface FS of the first non-folding area NFA1 and the display surface FS of the second non-folding area NFA2 are exposed to the outside. Further, the image IM may also be displayed on the display surface FS of the folding area FA exposed to the outside. As shown in the embodiment of FIG. 1, the electronic device ED may display the image IM while being in the first state (e.g., the non-folding state). The first non-folding area NFA1, the second non-folding area NFA2, and the folding area FA may respectively display images that provide independent information or may respectively display portions of a single image that provides one information.

The electronic device ED may be manufactured to have both the in-folding state and the out-folding state or may be manufactured to have only one of the in-folding and out-folding states.

Figure 3A:
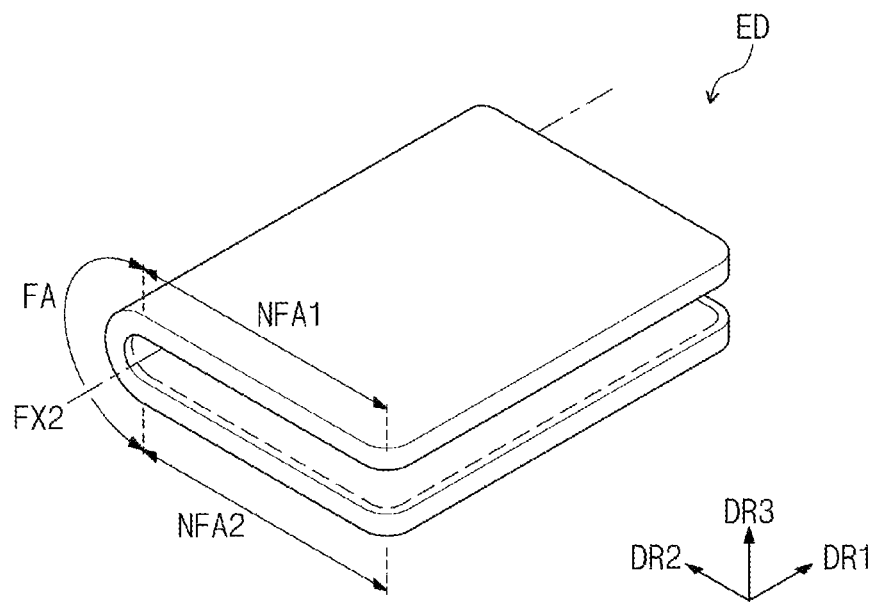
FIG. 3A is a perspective view showing a state in which the electronic device shown in FIG. 1 is inwardly folded (in-folding) about a second folding axis according to an embodiment of the present inventive concepts.
Figure 3B:
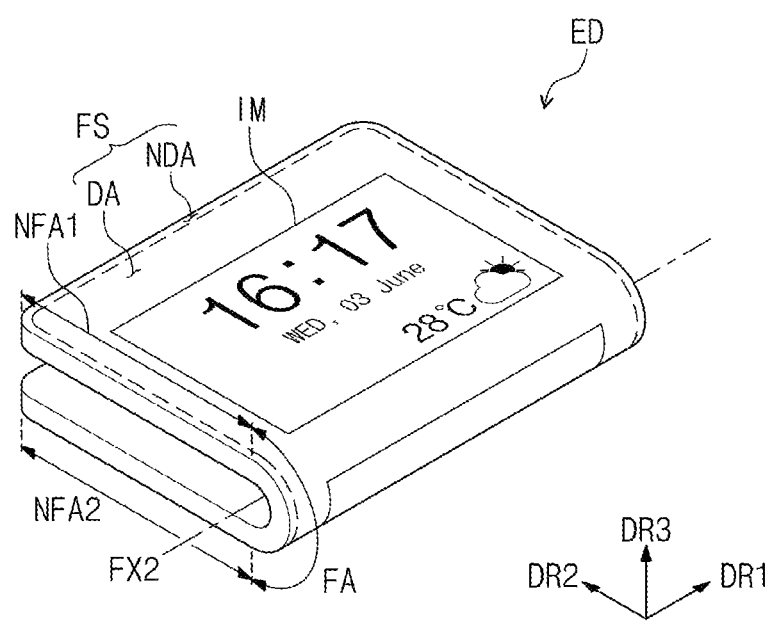
FIG. 3B is a perspective view showing a state in which the electronic device shown in FIG. 1 is outwardly folded (out-folding) about the second folding axis according to an embodiment of the present inventive concepts.

FIG. 3A is a perspective view showing a state in which the electronic device ED shown in FIG. 1 is inwardly folded (in-folding) about the second folding axis FX2, and FIG. 3B is a perspective view showing a state in which the electronic device ED shown in FIG. 1 is outwardly folded (out-folding) about the second folding axis FX2.

Referring to the embodiments of FIGS. 3A and 3B, the electronic device ED may be inwardly or outwardly folded about the second folding axis FX2. The second folding axis FX2 may extend in the first direction DR1, such as a minor axis direction.

The electronic device ED may include a plurality of areas defined therein according to its operation mode. The areas may include a folding area FA and at least one non-folding area, such as the first and second non-folding areas NFA1 and NFA2. The folding area FA may be defined between the first and second non-folding areas NFA1 and NFA2.

The folding area FA is folded about the second folding axis FX2 to form a curvature. The folding area FA may be folded about the second folding axis FX2 and may extend in the first direction DR1.

As an example, the non-folding areas may include a first non-folding area NFA1 and a second non-folding area NFA2. The first non-folding area NFA1 is disposed adjacent to a first side of the folding area FA in the second direction DR2, and the second non-folding area NFA2 is disposed adjacent to an opposite second side of the folding area FA in the second direction DR2.

In an embodiment, only one folding area FA is defined in the electronic device ED. However, embodiments of the present inventive concepts are not limited thereto or thereby. According to another embodiment of the present inventive concepts, a plurality of folding areas may be defined in the electronic device ED.

Figure 4:
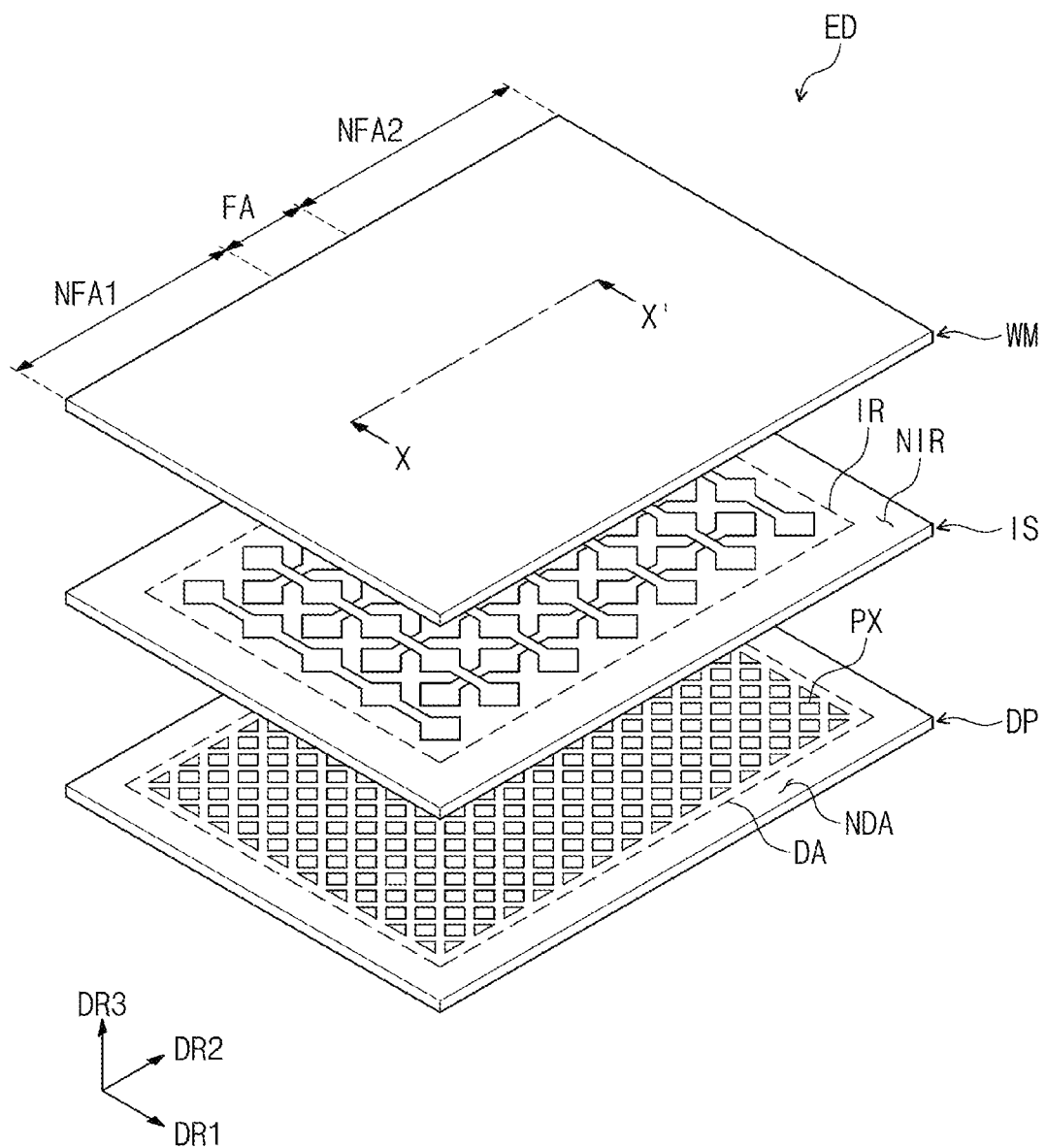
FIG. 4 is an exploded perspective view showing an electronic device according to an embodiment of the present inventive concepts.

FIG. 4 is an exploded perspective view showing the electronic device ED according to an embodiment of the present inventive concepts.

Referring to the embodiment of FIG. 4, the electronic device ED includes a window WM, an input sensor IS, and a display panel DP.

In an embodiment, the display panel DP may be one of a liquid crystal display panel (LCD), an organic light emitting display panel (OLED), a plasma display panel (PDP), and an electrophoretic display panel. The display panel DP may include a plurality of pixels PX arranged in a matrix form. In an embodiment, each pixel PX may have a lozenge shape. However, embodiments of the present inventive concepts are not limited thereto or thereby. For example, in an embodiment, each pixel PX may have a variety of shapes, such as a quadrangular shape, a triangular shape, etc. In addition, in an embodiment, the pixels PX may include red, green, and blue pixels. However, embodiments of the present inventive concepts are not limited thereto and the colors of the pixels PX may vary. For example, in an embodiment, the pixels PX may include at least one color pixel selected from the group consisting of red, green, blue, cyan, magenta, yellow, and white pixels.

The input sensor IS may be disposed on the display panel DP. The input sensor IS according to an embodiment of the present inventive concepts may have a structure in which a plurality of sensing electrodes is arranged on a substrate. However, embodiments of the present inventive concepts are not limited thereto or thereby. For example, the input sensor IS may be disposed directly on the display panel DP without a separate substrate, e.g., an on-cell structure, or may be disposed in the display panel DP, e.g., an in-cell structure. The input sensor IS may include an input sensing area IR and a non-input sensing area NIR around the input sensing area IR in a plane (e.g., a plane defined in the first and second directions DR1 and DR2). The input sensing area IR according to an embodiment of the present inventive concepts may include a touch sensing area and a fingerprint sensing area. In an embodiment, the fingerprint sensing area includes the touch sensing area. However, some portions of the touch sensing area may not include the fingerprint sensing area. For example, the touch sensing area may correspond to an entire input sensing area IR, and the fingerprint sensing area may correspond to a partial portion or the entire of input sensing area IR that is defined by fine sensing electrodes that cross each other. In an embodiment, the fingerprint sensing area may overlap the folding area FA and the non-folding areas, such as the first and second non-folding areas NFA1 and NFA2. Details on the fingerprint sensing area will be described later.

The input sensor IS according to an embodiment of the present inventive concepts may be a structure in which the sensing electrodes used to detect a capacitance are disposed on different layers from each other. However, embodiments of the present inventive concepts are not limited thereto or thereby. For example, the input sensor IS may have a structure in which the sensing electrodes used to detect the capacitance are disposed on the same layer and are distinct from each other (e.g., separated from each other) by a bridge electrode. As shown in the embodiment of FIG. 4, the window WM may be disposed on the input sensor IS. For example, a lower portion of the window WM may be disposed on an upper portion of the input sensor IS. In an embodiment, the window WM may include an optically transparent insulating material. Therefore, the user may easily perceive the image IM (see FIG. 1) generated by a display panel DP through the window WM. The window WM may include a thin film glass or a synthetic resin film. In an embodiment in which the window WM includes the thin film glass, the window WM may have a thickness (e.g., length in the third direction DR3) of about 80 micrometers or less. For example, in an embodiment, the window WM may have a thickness of about 30 micrometers. However, embodiments of the present inventive concepts are not limited thereto and the thickness of the window WM may vary. For example, in an embodiment in which the window WM includes the thin film glass, the window WM may have a thickness of about 30 micrometers or less.

In an embodiment in which the window WM includes the synthetic resin film, the window WM may include a polyimide (PI) film or a polyethylene terephthalate (PET) film. The window WM may have a single-layer or multi-layer structure. For example, the window WM may include a plurality of synthetic resin films coupled to each other by an adhesive or a glass substrate and the synthetic resin film coupled to the glass substrate by the adhesive. The window WM may include a flexible material. Thus, the window WM may be folded or unfolded about the first and second folding axes FX1 and FX2 (see FIG. 1). For example, the shape of the window WM may be variously changed to correspond to the shape of the display panel DP. In an embodiment in which the window WM includes the synthetic resin film, the window WM may have a thickness of about 100 micrometers or less.

The window WM transmits the image IM from the display panel DP and substantially simultaneously buffers external impacts to prevent the display panel DP from being damaged or malfunctioning due to external impacts. The external impacts are external forces, such as pressure and/or stress, which causes defects in the display panel DP.

Figure 5:
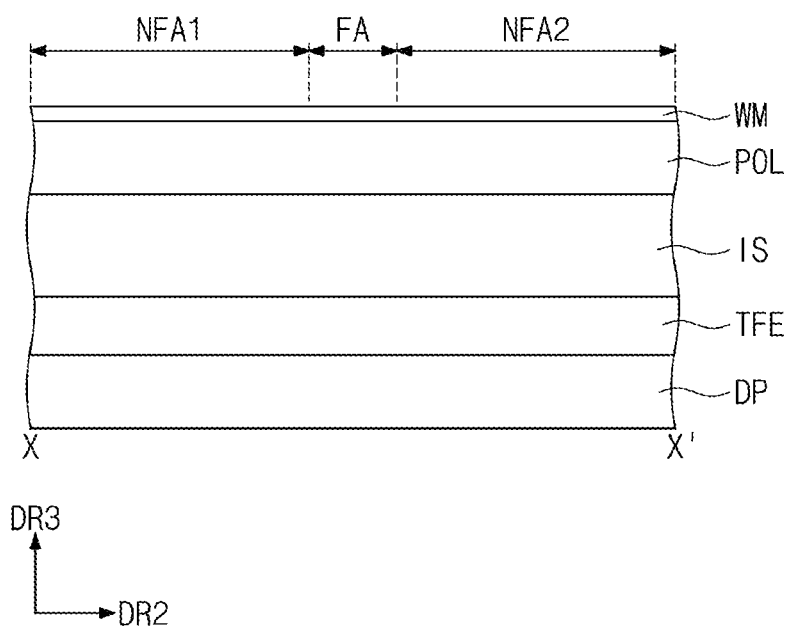
FIG. 5 is a cross-sectional view taken along line X-X' of FIG. 4 showing an electronic device according to an embodiment of the present inventive concepts.

FIG. 5 is a cross-sectional view showing the electronic device ED according to an embodiment of the present inventive concepts. FIG. 5 is a cross-sectional view taken along a line X-X' of FIG. 4.

Referring to the embodiment of FIG. 5, the electronic device ED includes the display panel DP, a thin film encapsulation layer TFE, the input sensor IS, an anti-reflective layer POL, and the window WM. While the thin film encapsulation layer TFE is shown to be distinct from the display panel DP in FIG. 5 for purposes of illustration, the thin film encapsulation layer TFE may be described as being included in the display panel DP. The input sensor IS may be disposed on the thin film encapsulation layer TFE. For example, the input sensor IS may be disposed directly on the thin film encapsulation layer TFE (e.g., in the third direction DR3).

The electronic device ED of the embodiment of FIG. 4 may also include the anti-reflective layer POL as shown in the embodiment of FIG. 5. As shown in the embodiment of FIG. 5, the anti-reflective layer POL may be disposed between the input sensor IS and the window WM (e.g., in the third direction DR3). The anti-reflective layer POL may prevent components included in the display panel DP from being perceived from the outside by the user due to an external light incident through the front surface of the electronic device ED. In an embodiment, the anti-reflective layer POL may include a retarder and a polarizer. In an embodiment, the retarder may be a film type or liquid crystal coating type and may include a $\lambda/2$ retarder and/or a $\lambda/4$ retarder. The polarizer may be a film type or liquid crystal coating type. In an embodiment, the film type polarizer may include a stretch-type synthetic resin film, and the liquid crystal coating type polarizer may include liquid crystals aligned in a predetermined alignment. The retarder and the polarizer may be implemented as one polarizing film.

The window WM may be disposed on the anti-reflective layer POL. The window WM may include a thin film glass having a thickness (e.g., length in the third direction DR3) of about 1 mm or less. The fingerprint sensing performance of the input sensor IS may be determined by the thickness of the window WM. According to an experimental example, a fingerprint sensor included in the input sensor IS is able to operate normally if the thickness of the window WM is about 100 um or less. For example, when the thickness of the window WM is about 300 um, a capacitance value measured between a fingerprint ridge and a valley, which is disposed between fingerprint ridges, of the fingerprint, e.g., a capacitance variation, is about 0.032 fF. When the thickness of the window WM is about 100 um, the capacitance variation is about 0.278 fF, and when the thickness of the window WM is about 10 um, the capacitance variation is about 1.308 fF. For example, when thickness of the window WM is equal to or smaller than about 100 um, a variation of a capacitance substantially occurs, and this means that the fingerprint is able to be sensed.

Figure 6A:
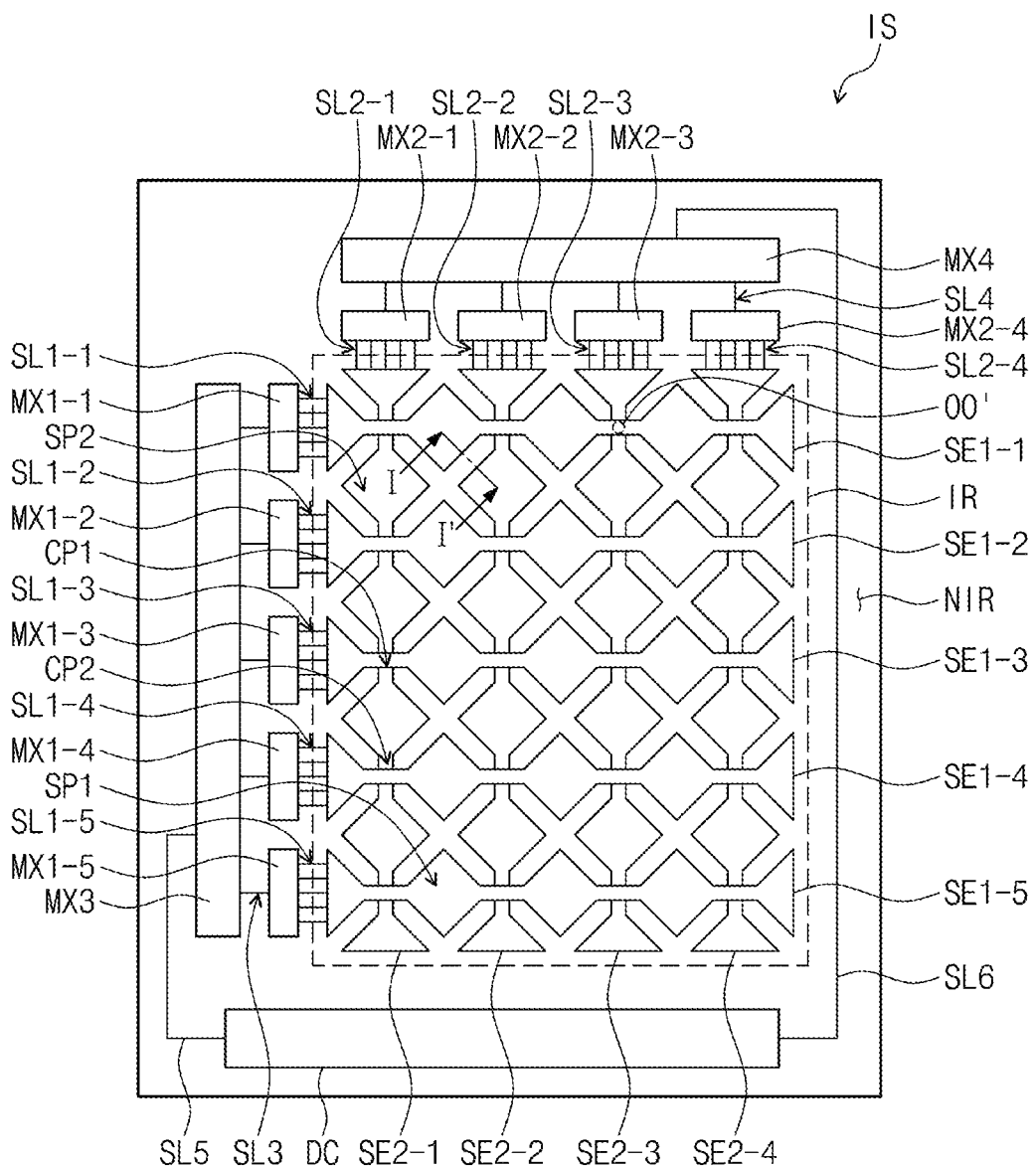
FIG. 6A is a plan view showing an input sensor according to an embodiment of the present inventive concepts.
Figure 6B:
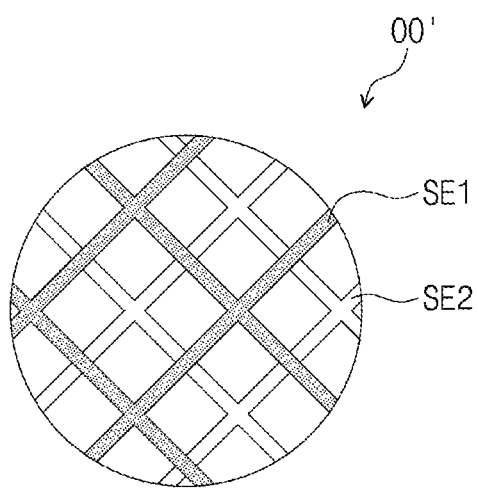
FIG. 6B is an enlarged plan view of region 00' of FIG. 6A showing an input sensor according to an embodiment of the present inventive concepts.
Figure 7:
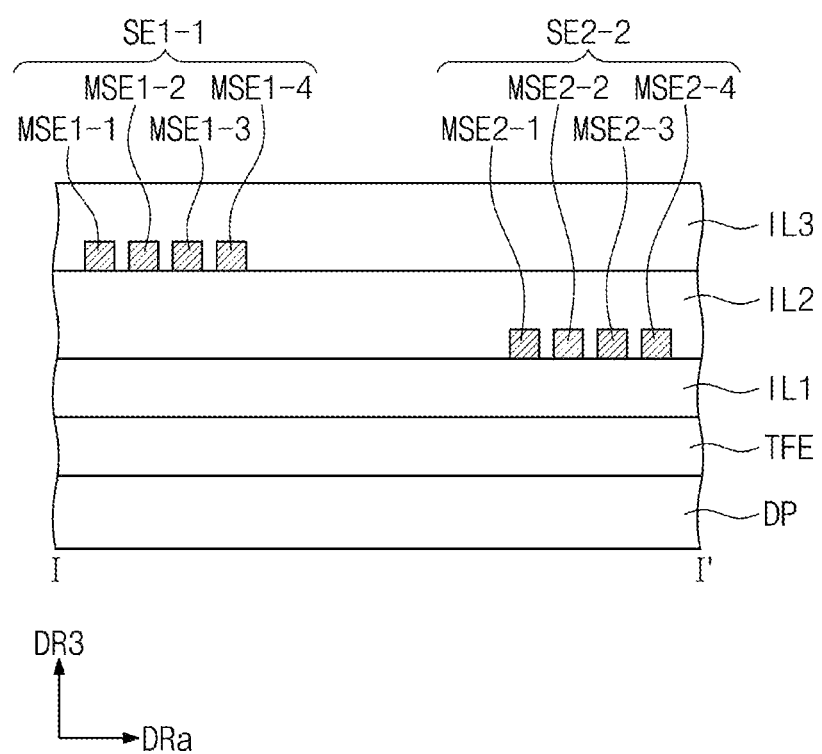
FIG. 7 is a cross-sectional view taken along line I-I' of FIG. 6A showing an input sensor according to an embodiment of the present inventive concepts.

FIGS. 6A and 6B are plan views showing an input sensor according to an embodiment of the present inventive concepts. FIG. 7 is a cross-sectional view showing an input sensor according to an embodiment of the present inventive concepts. FIG. 6B is an enlarged view showing a portion of the input sensor of FIG. 6A.

Referring to the embodiments of FIGS. 6A and 6B, the input sensor IS includes a first sensing electrode SE1, a second sensing electrode SE2, a first signal line, such as first to fifth first signal lines SL1-1 to SL1-5, and a second signal line, such as first to fourth second signal lines SL2-1 to SL2-4. Referring to the embodiment of FIG. 7, the input sensor IS includes a first insulating layer IL1, a second insulating layer IL2, and a third insulating layer IL3. The first sensing electrode SE1 is disposed on the second insulating layer IL2, and the second sensing electrode SE2 may be disposed on the first insulating layer IL1. For example, the first sensing electrode SE1 may be disposed directly on an upper surface of the second insulating layer IL2 (e.g., in the third direction DR3) and the second sensing electrode SE2 may be disposed directly on an upper surface of the first insulating layer IL1 (e.g., in the third direction DR3). For example, the first sensing electrode SE1 may be disposed on a layer different from a layer on which the second sensing electrode SE2 is disposed.

In an embodiment, the first sensing electrode SE1 may include a plurality of first sensing electrodes, such as first to fifth first sensing electrodes SE1-1 to SE1-5 extending in the first direction DR1 and arranged in the second direction DR2. The second sensing electrode SE2 may include a plurality of second sensing electrodes, such as first to fourth second sensing electrodes SE2-1 to SE2-4 extending in the second direction DR2 and arranged in the first direction DR1. The first sensing electrode SE1 and the second sensing electrode SE2 may be disposed in the input sensing area IR. For example, the first to fifth first sensing electrodes SE1-1 to SE1-5 and the first to fourth second sensing electrodes SE2-1 to SE2-4 may be disposed in a touch sensing area and a fingerprint sensing area.

As shown in the embodiment of FIG. 6A, the first to fifth first sensing electrodes SE1-1 to SE1-5 are arranged in the second direction DR2. The first to fifth first sensing electrodes SE1-1 to SE1-5 may include a plurality of first portions SP1 and a plurality of second portions CP1 connecting each first portion SP1 to an adjacent first portion SP1 (e.g., in the first direction DR1). The first portions SP1 may correspond to sensing portions, and the second portions CP1 may correspond to connection portions.

As shown in the embodiment of FIG. 6A, the first to fourth second sensing electrodes SE2-1 to SE2-4 may be arranged in the first direction DR1. The first to fourth second sensing electrodes SE2-1 to SE2-4 may include a plurality of third portions SP2 and a plurality of fourth portions CP2 connecting each third portion SP2 to an adjacent third portion SP2 (e.g., in the second direction DR2). The third portions SP2 may correspond to sensing portions, and the fourth portions CP2 may correspond to connection portions.

In the embodiment of FIG. 6A, the first portions SP1 and the third portions SP2 are shown to have the form of a surface electrode having a lozenge shape. However, embodiments of the present inventive concepts are not limited thereto and the shapes of the first portions SP1 and the third portions SP2 may vary. For example, in an embodiment the first portions SP1 and the third portions SP2 may have a quadrangular shape, a triangular shape, a circular shape, an oval shape, a semi-circular shape, a polygonal shape, or a combination thereof. The first portions SP1, the second portions CP1, the third portions SP2, and the fourth portions CP2 may have a mesh shape. These will be described in detail with reference to the embodiments of FIGS. 8A, 8B, 9A, and 9B.

According to an embodiment of the present inventive concepts, the first to fifth first sensing electrodes SE1-1 to SE1-5 and the first to fourth second sensing electrodes SE2-1 to SE2-4 may include a plurality of fine sensing electrodes. For example, the first to fifth first sensing electrodes SE1-1 to SE1-5 may include first fine sensing electrodes, and the first to fourth second sensing electrodes SE2-1 to SE2-4 may include second fine sensing electrodes. The first fine sensing electrodes may be formed by cutting each of the first to fifth first sensing electrodes SE1-1 to SE1-5 along one direction DRa. This will be described in detail with reference to the embodiments of FIGS. 9A and 9B.

The first signal line may be connected to the first sensing electrode SE1. For example, the first signal line may be connected to an end (e.g., in the first direction DR1) of the first sensing electrode SE1. The first signal line may be provided in plural, and as shown in the embodiment of FIG. 6A, the first to fifth first signal lines SL1-1 to SL1-5 may be respectively connected to the first to fifth first sensing electrodes SE1-1 to SE1-5. According to an embodiment, each of first to fifth first signal lines SL1-1 to SL1-5 may include a plurality of first fine signal lines.

The second signal line may be connected to the second sensing electrodes SE2. For example, the second signal line may be connected to an end (e.g., in the second direction DR2) of the second sensing electrode SE2. The second signal line may be provided in plural, and as shown in the embodiment of FIG. 6A, the first to fourth second signal lines SL2-1 to SL2-4 may be respectively connected to the first to fourth second sensing electrodes SE2-1 to SE2-4. According to an embodiment of the present inventive concepts, each of first to fourth second signal lines SL2-1 to SL2-4 may include a plurality of second fine signal lines.

The electronic device ED may include a plurality of first multiplexers, such as the first to fifth first multiplexers MX1-1 to MX1-5, respectively connected to the first fine signal lines and a plurality of second multiplexers, such as the first to fourth second multiplexers MX2-1 to MX2-4, respectively connected to the second fine signal lines. As shown in the embodiment of FIG. 6A, the first to fifth first multiplexers MX1-1 to MX1-5 may be connected to a third multiplexer MX3 through a third signal line SL3, and the first to fourth second multiplexers MX2-1 to MX2-4 may be connected to a fourth multiplexer MX4 through a fourth signal line SL4. While the embodiment of FIG. 6A shows one third multiplexer MX3 and one fourth multiplexer MX4, embodiments of the present inventive concepts are not limited thereto and the third and fourth multiplexers MX3 and MX4 may be provided in plural. As shown in the embodiment of FIG. 6A, the third and fourth multiplexers MX3 and MX4 may be connected to a driving circuit DC respectively through fifth and sixth signal lines SL5 and SL6. The first to fourth multiplexers (e.g., MX1-1 to MX1-5) to MX4 may connect the fine sensing electrodes to the driving circuit DC through the fine signal lines. The number of the fine signal lines increases as the number of the fine sensing electrodes increases, and the fine signal lines may be sorted out using the first multiplexer to fourth multiplexer MX4.

The driving circuit DC may detect a presence of touch and a touch coordinate and may sense the fingerprint. For example, the driving circuit DC may include a touch driving portion that controls a touch input and a fingerprint recognition portion that controls a fingerprint input. In an embodiment, the driving circuit DC may input a driving signal to the first or second sensing electrodes SE1 or SE2 and may detect the presence of touch and the touch coordinate using the variation in capacitance or a variation in voltage measured in the second or first sensing electrode SE2 or SEL. The driving circuit DC may input the driving signal to the first or second sensing electrode SE1 or SE2 and may sense the fingerprint using the variation in capacitance or the variation in voltage measured in the second or first sensing electrode SE2 or SE1. For example, when a touch event occurs in the fingerprint sensing area for more than a predetermined time period, the driving circuit DC may sense the touched fingerprint and may generate fingerprint information. The fingerprint is an impression left by friction ridges on a person's fingertips and formed of the ridges and the valleys that are spaces between the ridges. For example, when a finger touches the fingerprint sensing area, the ridges are in contact with the fingerprint sensing area, but the valleys are not in contact with the fingerprint sensing area. For example, coordinates at which the capacitance measured in the second or first sensing electrode SE2 or SE1 is varied may correspond to the ridges, and coordinates at which the capacitance measured in the second or first sensing electrode SE2 or SE1 is not varied may correspond to the valley. The fingerprint may be sensed by the driving circuit DC in this way. In an embodiment, the driving circuit DC may be disposed directly on the display panel DP in an integrated circuit (IC) form or may be implemented as a separate element. For example, in an embodiment, the driving circuit DC may be implemented in one integrated circuit that includes the touch driving portion and the fingerprint recognition portion. In an embodiment, the touch driving portion and the fingerprint recognition portion may be disposed separately from each other.

FIG. 6B is an enlarged view showing an area OO' of FIG. 6A. In the embodiment of FIG. 6B, the first sensing electrode SE1 and the second sensing electrode SE2 may overlap each other (e.g., in the third direction DR3). A partial portion of the mesh lines of the first sensing electrode SE1 and mesh lines of the second sensing electrode SE2 may not overlap each other (e.g., in the third direction DR3) and may be alternately disposed. Accordingly, a magnetic field between the first sensing electrode SE1 and the second sensing electrode SE2 may easily escape in an upper direction (e.g., the third direction DR3), and thus, a sensing sensitivity may increase.

FIG. 7 is a cross-sectional view taken along a line I-I' of FIG. 6A. In the embodiment of FIG. 7, the first first sensing electrode SE1-1 may include a plurality of first fine sensing electrodes, such as first to fourth first fine sensing electrodes MSE1-1 to MSE1-4. The second second sensing electrode SE2-2 may include a plurality of second fine sensing electrodes, such as first to fourth second fine sensing electrodes MSE2-1 to MSE 2-4. In the embodiment of FIG. 7, the first first sensing electrode SE1-1 includes four first fine sensing electrodes and the second second sensing electrode SE2-2 includes four second fine sensing electrodes. However, embodiments of the present inventive concepts are not limited thereto and the number of each of the first and second fine sensing electrodes may vary. For example, the numbers of each of the first and second fine sensing electrodes may be five or more. For example, in an embodiment, each of the first sensing electrodes SE1 may include about twenty or about forty first fine sensing electrodes and each of the second sensing electrodes SE2 may include about twenty or about forty second fine sensing electrodes.

According to an embodiment of the present inventive concepts, the second insulating layer IL2 may have a thickness (e.g., length in the third direction DR3) that is greater than a thickness of the first insulating layer IL1. The second insulating layer IL2 may be disposed between the first first sensing electrode SE1-1 and second second sensing electrode SE2-2 (e.g., in the third direction DR3). Accordingly, since the magnetic field is easily escaped to the upper direction (e.g., the third direction DR3), as the thickness of the second insulating layer IL2 increases, the thickness of the second insulating layer IL2 may be formed to be large and may be relatively larger than that of the first insulating layer IL1.

Figure 8A:
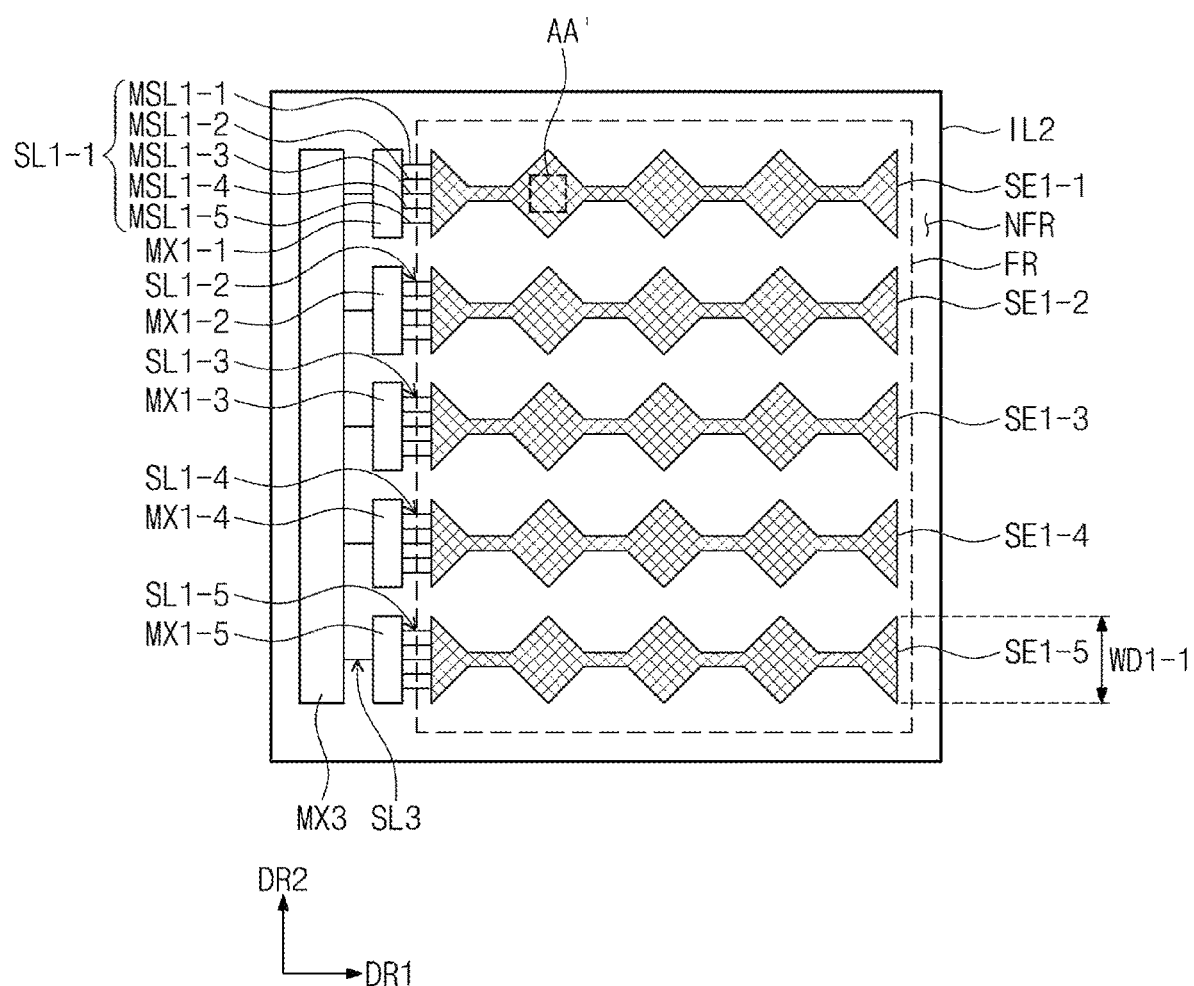
FIG. 8A is a plan view showing a first sensing electrode according to an embodiment of the present inventive concepts.
Figure 8B:
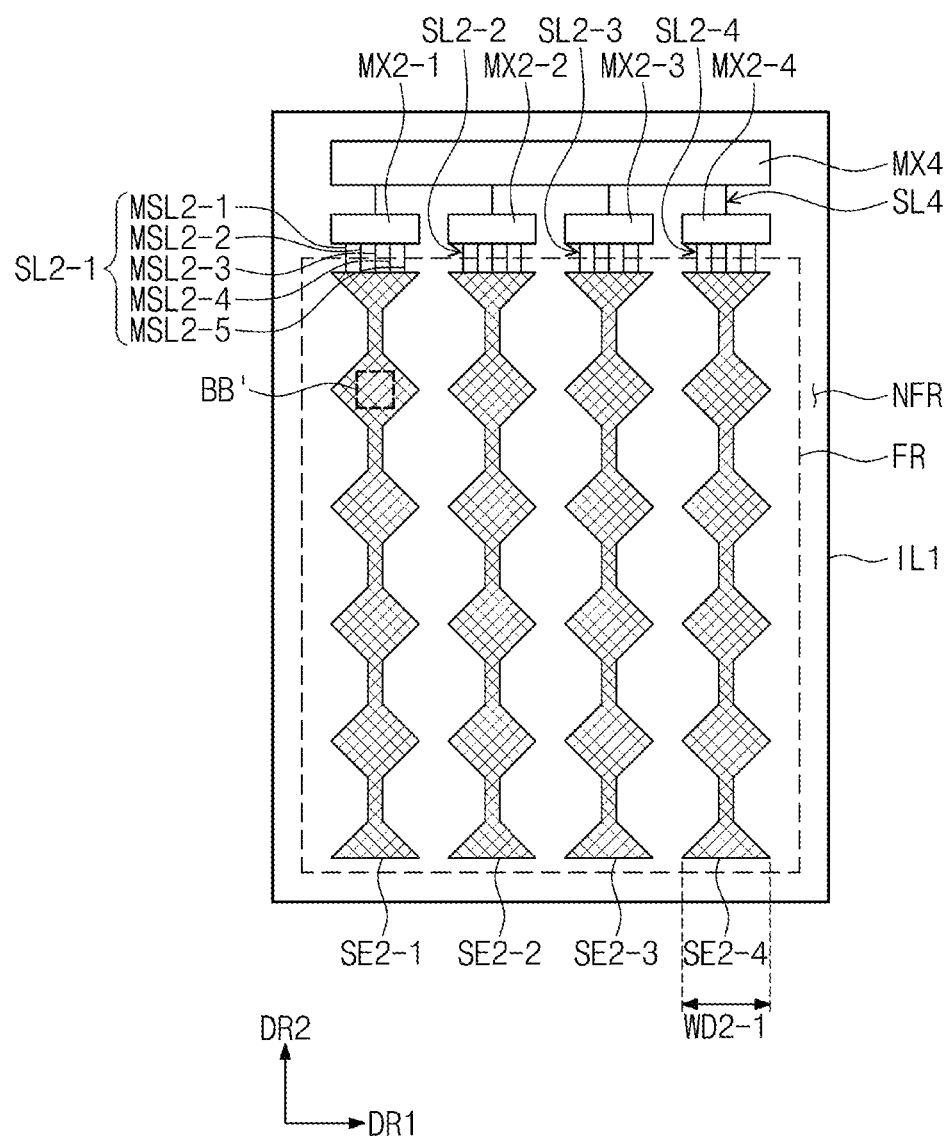
FIG. 8B is a plan view showing a second sensing electrode according to an embodiment of the present inventive concepts.
Figure 9A:
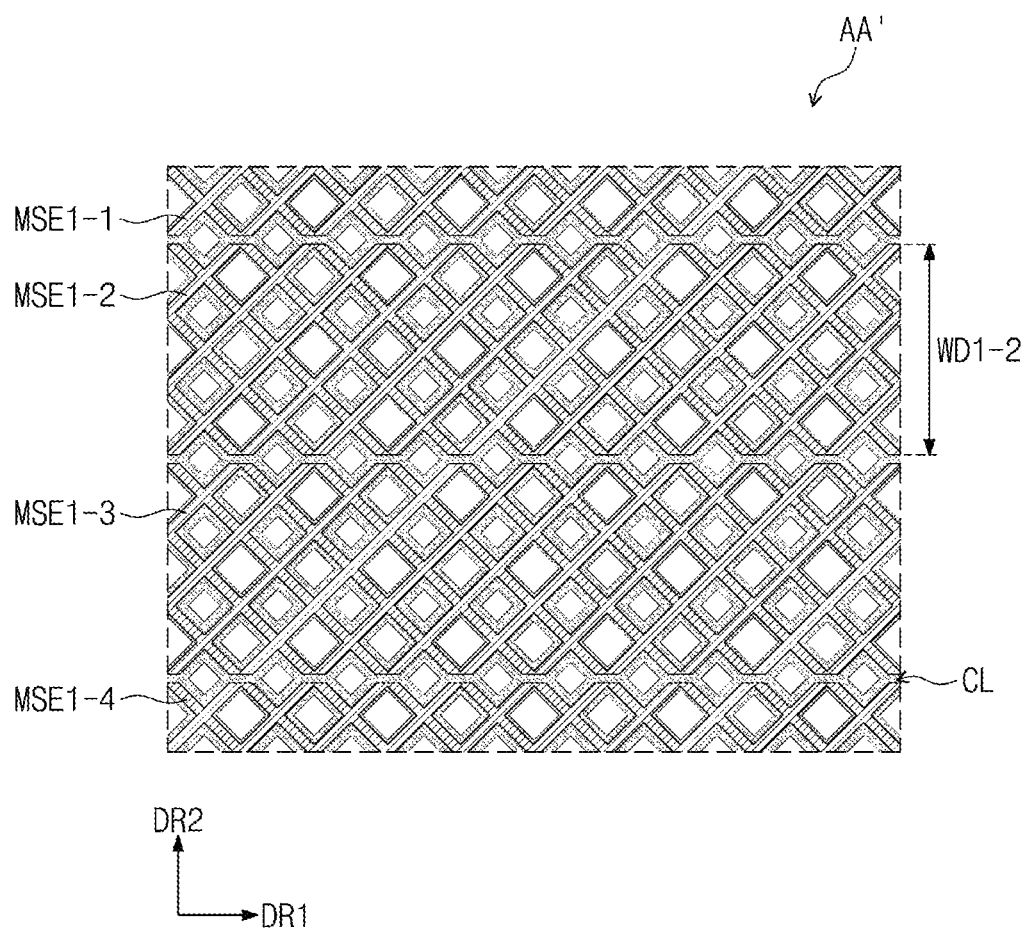
FIG. 9A is a plan view of region AA' of FIG. 8A showing a plurality of fine sensing electrodes according to an embodiment of the present inventive concepts.
Figure 9B:
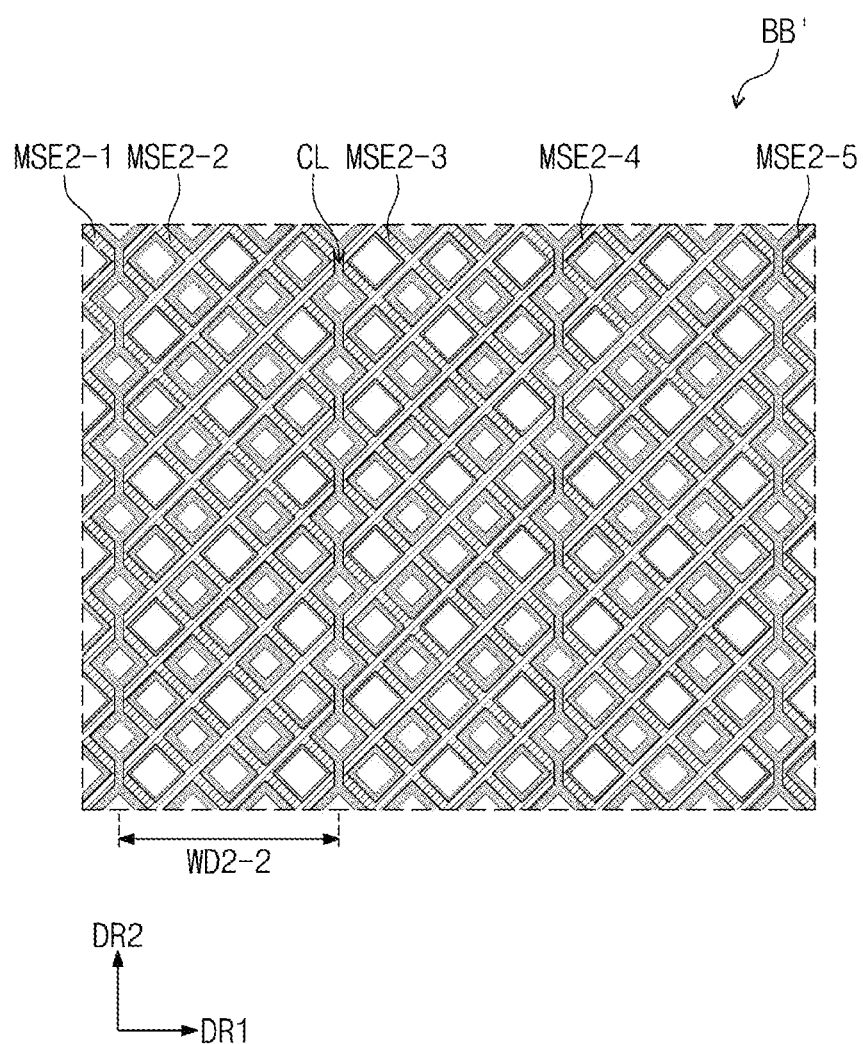
FIG. 9B is a plan view of region BB' of FIG. 8B showing a plurality of fine sensing electrodes according to an embodiment of the present inventive concepts.

FIG. 8A is a plan view showing the first sensing electrode SE1 according to an embodiment of the present inventive concepts. FIG. 8B is a plan view showing the second sensing electrode SE2 according to an embodiment of the present inventive concepts. FIGS. 9A and 9B are views showing the fine sensing electrodes according to embodiments of the present inventive concepts. FIG. 9A is an enlarged view showing an area AA' of FIG. 8A, and FIG. 9B is an enlarged view showing an area BB' of FIG. 8B.

Referring to the embodiments of FIGS. 8A and 9A, the first sensing electrode SE1 may include the first to fifth first sensing electrodes SE1-1 to SE1-5. The first to fifth first sensing electrodes SE1-1 to SE1-5 may be disposed on the second insulating layer IL2. While the embodiment of FIG. 8A includes five first sensing electrodes SE1, such as the first to fifth first sensing electrodes SE1-1 to SE1-5, embodiments of the present inventive concepts are not limited thereto. For example, in an embodiment, the number of the first sensing electrodes SE1 may be greater than five. The first to fifth first sensing electrodes SE1-1 to SE1-5 may include a plurality of mesh lines. For example, the first to fifth first sensing electrodes SE1-1 to SE1-5 may have a mesh shape. In the embodiments of FIGS. 8A and 9A, each of the first to fifth first sensing electrodes SE1-1 to SE1-5 may include the first to fourth first fine sensing electrodes MSE1-1 to MSE1-4. The input sensing area IR (refer to FIG. 6A) may correspond to the fingerprint sensing area FR.

In the embodiment of FIG. 9A, four first fine sensing electrodes, such as the first to fourth first fine sensing electrodes MSE1-1 to MSE1-4, are shown in the area AA'. However, embodiments of the present inventive concepts are not limited thereto and the number of the first fine sensing electrodes may vary. For example, in an embodiment about twenty or about forty first fine sensing electrodes may be provided for each first sensing electrode SE1.

The first to fourth first fine sensing electrodes MSE1-1 to MSE1-4 may be respectively connected to the first to fourth first fine signal lines MSL1-1 to MSL1-4. The first to fourth first fine signal lines MSL1-1 to MSL1-4 may be connected to the first first multiplexer MX1-1.

In an embodiment of the present inventive concepts, each of the first to fifth first sensing electrodes SE1-1 to SE1-5 may have a width WD1-1 (e.g., length in the second direction DR2) of about 4 mm. For example, the width WD1-1 of the first portion SP1 of each of the first to fifth first sensing electrodes SE1-1 to SE1-5 may be about 4 mm.

Each of the first to fourth first fine sensing electrodes MSE1-1 to MSE1-4 may have a width WD1-2 in a range of about 100 um to about 200 um. The width WD1-2 of each of the first to fourth first fine sensing electrodes MSE1-1 to MSE1-4 may be substantially the same as a width of the ridge of a fingerprint. For example, since the width of the ridge is in a range of about 100 um to about 200 um, the width WD1-2 of each of the first to fourth first fine sensing electrodes MSE1-1 to MSE1-4 may be in a range from about 100 um to about 200 um.

In an embodiment, when the width WD1-1 of each of the first to fifth first sensing electrodes SE1-1 to SE1-5 is about 4 mm and the width WD1-2 of each of the first to fourth first fine sensing electrodes MSE1-1 to MSE1-4 is about 100 um, each of the first to fifth first sensing electrodes SE1-1 to SE1-5 may include about forty first fine sensing electrodes. When the width WD1-1 of each of the first to fifth first sensing electrodes SE1-1 to SE1-5 is about 4 mm and the width WD1-2 of each of the first to fourth first fine sensing electrodes MSE1-1 to MSE1-4 is about 200 um, each of the first to fifth first sensing electrodes SE1-1 to SE1-5 may include about twenty first fine sensing electrodes.

For example, the width WD1-1 of each of the first to fifth first sensing electrodes SE1-1 to SE1-5 may be about twenty or about forty times greater than the width WD1-2 of each of the first to fourth first fine sensing electrodes MSE1-1 to MSE1-4. As shown in the embodiment of FIG. 9A, the first to fourth first fine sensing electrodes MSE1-1 to MSE1-4 may be separated from each other by a cutting line CL.

Referring to the embodiments of FIGS. 8B and 9B, the second sensing electrode SE2 may include the first to fourth second sensing electrodes SE2-1 to SE2-4. The first to fourth second sensing electrodes SE2-1 to SE2-4 may be disposed on the first insulating layer ILL. In the embodiment of FIG. 8B, four second sensing electrodes SE2, such as the first to fourth second sensing electrodes SE2-1 to SE2-4, are shown. However, embodiments of the present inventive concepts are not limited thereto and the numbers of the second sensing electrodes SE2 may vary. For example, in an embodiment, five or more second sensing electrodes SE2 may be provided. The first to fourth second sensing electrodes SE2-1 to SE2-4 may include a plurality of mesh lines. For example, the first to fourth second sensing electrodes SE2-1 to SE2-4 may have a mesh shape. As shown in the embodiments of FIGS. 8B and 9B, each of the first to fourth second sensing electrodes SE2-1 to SE2-4 may include a plurality of second fine sensing electrodes, such as the first to fifth second fine sensing electrodes MSE2-1 to MSE2-5. The input sensing area IR (refer to FIG. 6A) may correspond to the fingerprint sensing area FR.

In the embodiment of FIG. 9B, five second fine sensing electrodes, such as the first to fifth second fine sensing electrodes MSE2-1 to MSE2-5 are disposed in the area BB'. However, embodiments of the present inventive concepts are not limited thereto and the number of the second fine sensing electrodes for each second sensing electrode SE2 may vary. For example, in an embodiment, about twenty or about forty second fine sensing electrodes may be disposed in the area BB'.

The first to fifth second fine sensing electrodes MSE2-1 to MSE2-5 may be respectively connected to the first to fifth second fine signal lines MSL2-1 to MSL2-5. The first to fifth second fine signal lines MSL2-1 to MSL2-5 may be connected to the first second multiplexer MX2-1.

In an embodiment, each of the first to fourth second sensing electrodes SE2-1 to SE2-4 may have a width WD2-1 (e.g., length in the first direction DR1) of about 4 mm. For example, the width WD2-1 of the third portion SP2 of the first to fourth second sensing electrodes SE2-1 to SE2-4 may be about 4 mm. In an embodiment, each of the first to fifth second fine sensing electrodes MSE2-1 to MSE2-5 may have a width WD2-2 in a range of about 100 um to about 200 um. The width WD2-2 of each of the first to fifth second fine sensing electrodes MSE2-1 to MSE2-5 may be substantially the same as the width of the ridge of the fingerprint. For example, since the width of the ridge of the fingerprint is in a range of about 100 um to about 200 um, the width WD2-2 of each of the first to fifth second fine sensing electrodes MSE2-1 to MSE2-5 may be in a range of about 100 um to about 200 um.

In an embodiment, when the width WD2-1 of each of the first to fourth second sensing electrodes SE2-1 to SE2-4 is about 4 mm and the width WD2-2 of each of the first to fifth second fine sensing electrodes MSE2-1 to MSE2-5 is about 100 um, each of the first to fourth second sensing electrodes SE2-1 to SE2-4 may include about forty second fine sensing electrodes. In an embodiment in which the width WD2-1 of each of the first to fourth second sensing electrodes SE2-1 to SE2-4 is about 4 mm and the width WD2-2 of each of the first to fifth second fine sensing electrodes MSE2-1 to MSE2-5 is about 200 um, each of the first to fourth second sensing electrodes SE2-1 to SE2-4 may include about twenty second fine sensing electrodes.

For example, the width WD2-1 of each of the first to fourth second sensing electrodes SE2-1 to SE2-4 may be twenty or forty times greater than the width WD2-2 of each of the first to fifth second fine sensing electrodes MSE2-1 to MSE2-5.

As shown in the embodiment of FIG. 9B, the first to fifth second fine sensing electrodes MSE2-1 to MSE2-5 may be separated from each other by the cutting line CL.

FIGS. 10A to 10D are plan views showing input sensors IS according to an embodiment of the present inventive concepts. The fingerprints represented in the drawings may include a plurality of fingerprints in various locations.

Figure 10A:
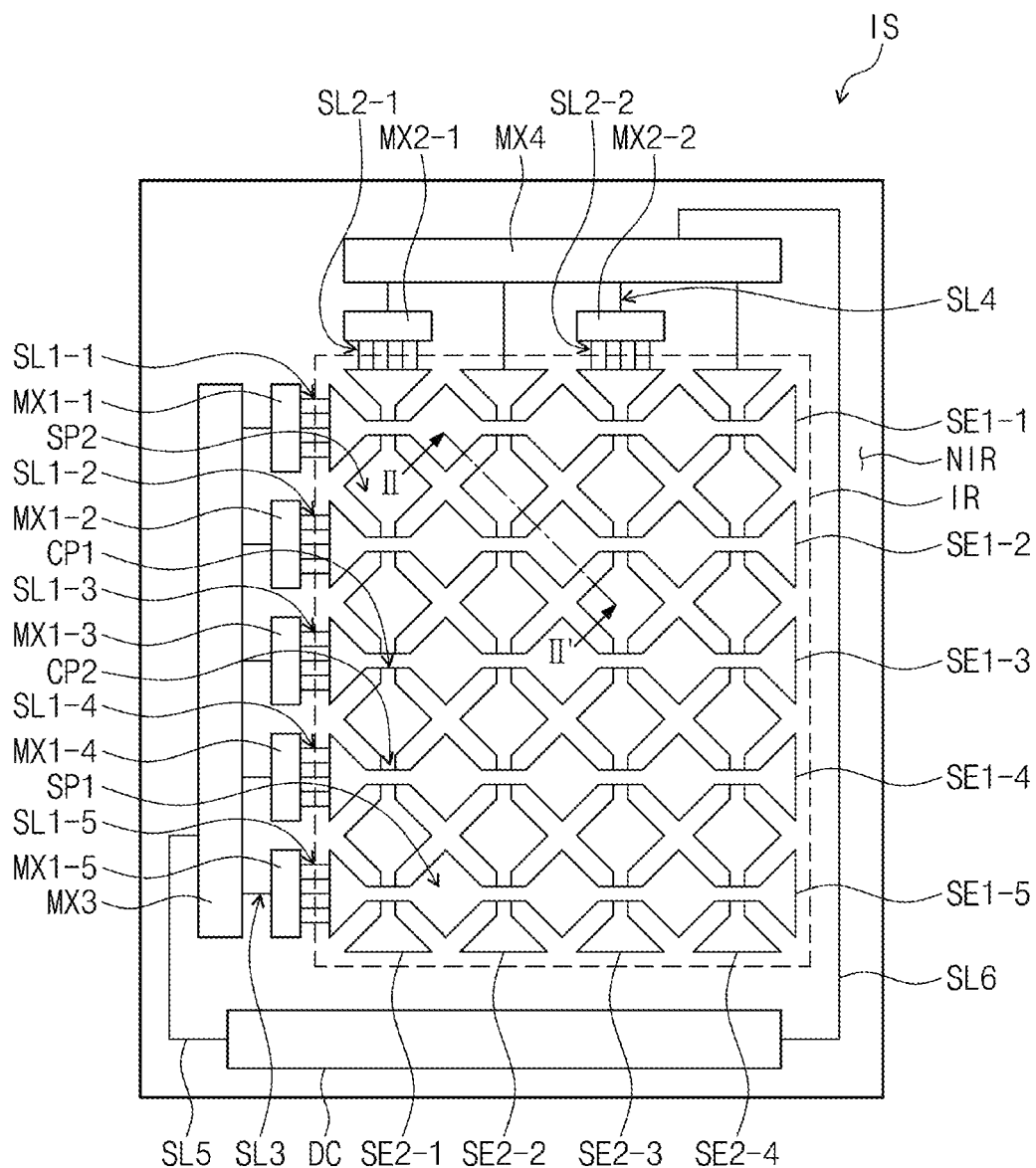
FIGS. 10A to 10D are plan views showing input sensors according to embodiments of the present inventive concepts.
Figure 10A:
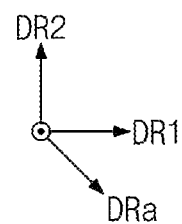
Figure 10B:
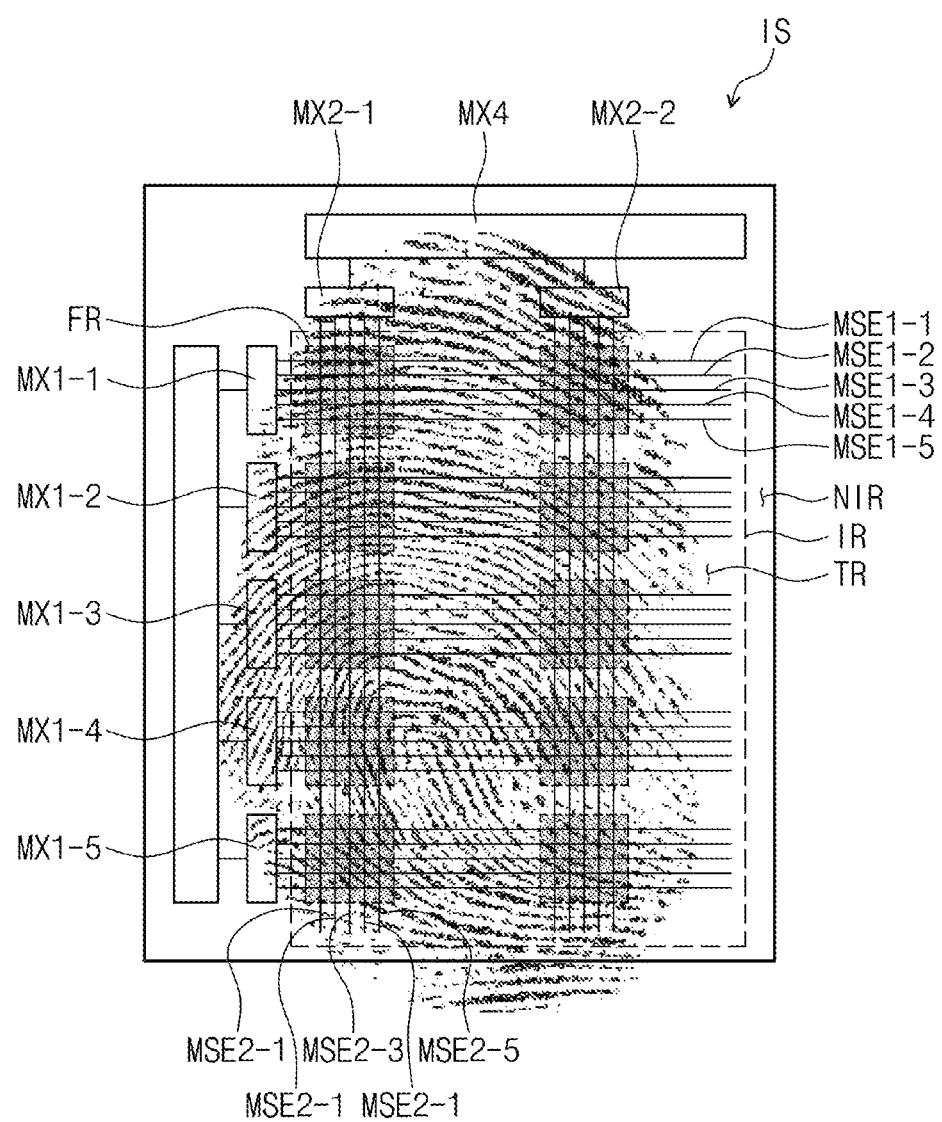
Figure 10C:
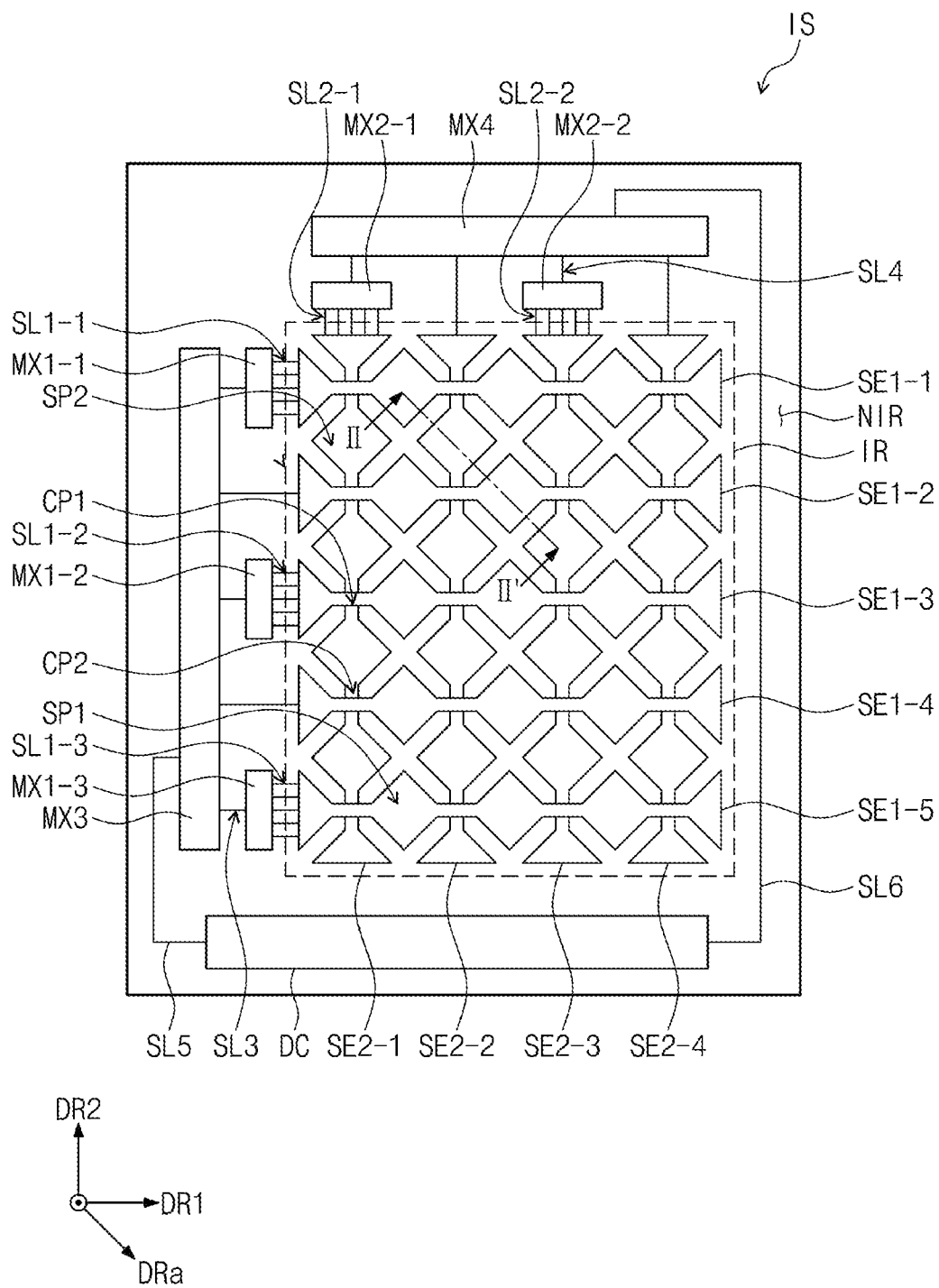

The embodiment of FIG. 10A shows the input sensor IS in which only a partial portion of the second sensing electrodes SE2 include fine sensing electrodes. The embodiment of FIG. 10B shows a fingerprint sensing area FR of the input sensor IS of FIG. 10A. The embodiment of FIG. 10C shows the input sensor IS in which only partial portions of the first and second sensing electrodes SE1 and SE2 includes the fine sensing electrodes. The embodiment of FIG. 10D shows a fingerprint sensing area FR of the input sensor IS of the embodiment of FIG. 10C.

In the embodiments of FIGS. 10A and 10B, each of the first to fifth first sensing electrodes SE1-1 to SE1-5 may include a plurality of fine sensing electrodes. However, in the embodiments of FIGS. 10A and 10B only a partial portion of the first to fourth second sensing electrodes SE2-1 to SE2-4 may include a plurality of fine sensing electrodes. Areas where the fine sensing electrodes cross each other may correspond to the fingerprint sensing area FR. In the embodiment of FIG. 10B, a half of the input sensing area IR of the input sensor IS may correspond only to the touch sensing area TR. The other half of the input sensing area IR may correspond to both the touch sensing area TR and the fingerprint sensing area FR. In the embodiment of FIGS. 10A and 10B, only the half of the touch sensing area TR may be used as the fingerprint sensing area FR to sense the fingerprint. Accordingly, the number of signal lines in the embodiments of FIGS. 10A and 10B may be reduced when compared with the number of the signal lines in the embodiment of FIG. 6A. In the embodiment of FIGS. 10A and 10B, the number of the second multiplexers, such as the first and second second multiplexers MX2-1 and MX2-2, is smaller than that in the embodiment of FIG. 6A. In an embodiment, the first sensing electrode SE1 may have an area that is substantially the same as a sum of the areas of the fine sensing electrodes included in the first sensing electrode SE1.

Figure 10D:
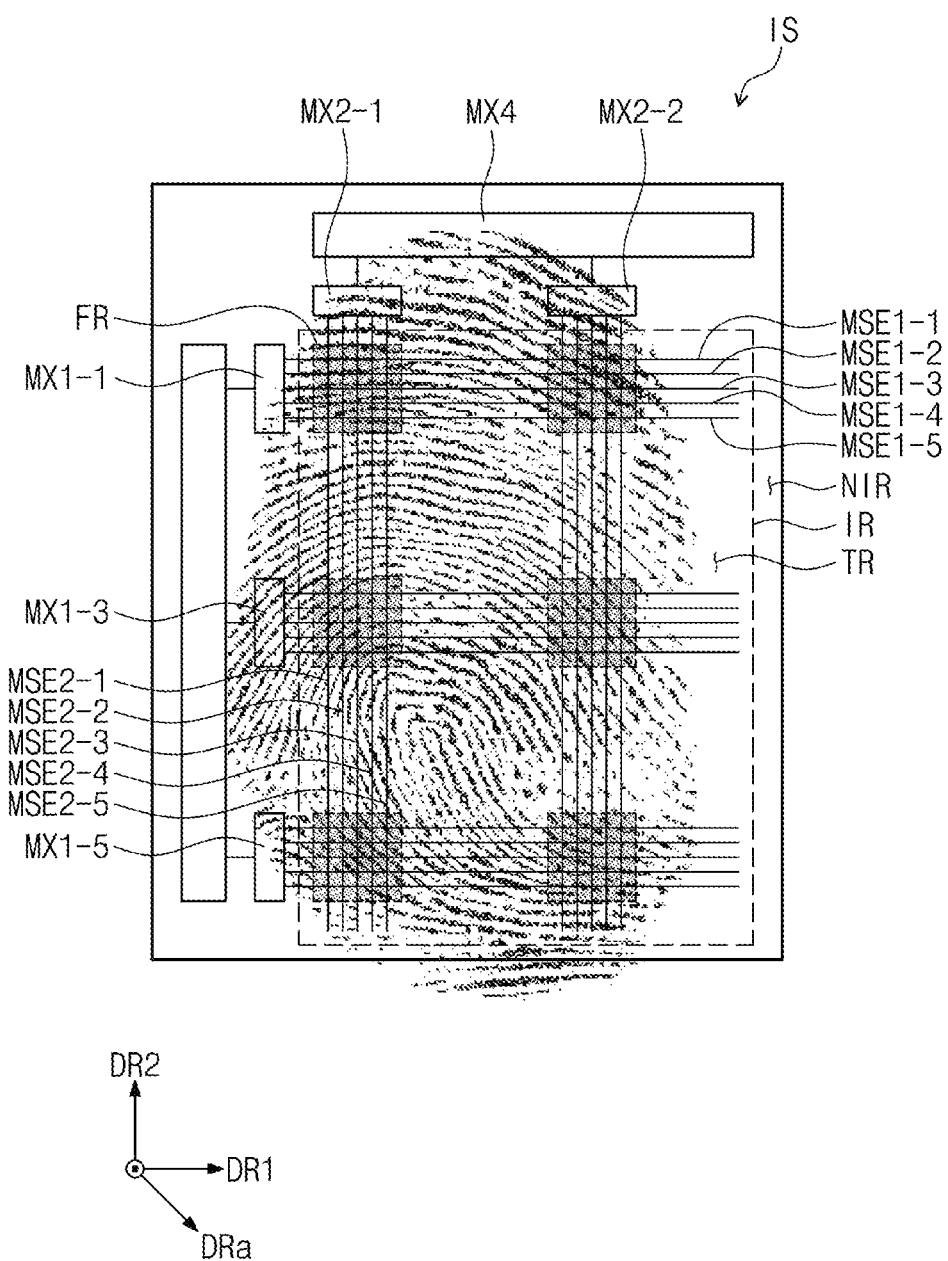

In the embodiments of FIGS. 10C and 10D, a partial portion of the first to fifth first sensing electrodes SE1-1 to SE1-5 and a partial portion of the first to fourth second sensing electrodes SE2-1 to SE2-4 may include a plurality of fine sensing electrodes. For example, a partial portion of the first to fifth first sensing electrodes SE1-1 to SE1-5 may include the sensing electrode having a width of about 4 mm, and the other partial portion of the first to fifth first sensing electrodes SE1-1 to SE1-5 may include the fine sensing electrode having a width in a range of about 100 um to about 200 um. For example, each of first, third, and fifth first sensing electrodes SE1-1, SE1-3, and SE1-5 in the second direction DR2 may include the first to fifth first fine sensing electrodes MSE1-1 to MSE1-5 and the second and fourth first sensing electrodes SE1-2 and SE1-4 may not include the first to fifth first fine sensing electrodes MSE1-1 to MSE1-5. Each of first and third second sensing electrodes SE2-4 and SE2-3 in the first direction DR1 may include the first to fifth second fine sensing electrodes MSE2-4 to MSE2-5 and the second and fourth second sensing electrodes SE2-2 and SE2-4 may not include the first to fifth second fine sensing electrodes MSE2-1 to MSE2-5. The input sensing area IR may include the touch sensing area TR. In the input sensing area IR, areas where the first fine sensing electrodes cross the second fine sensing electrodes may correspond to both the touch sensing area TR and the fingerprint sensing area FR.

In the embodiment of FIG. 10D, about a quarter (¼) of the input sensing area IR may correspond to both the touch sensing area TR and the fingerprint sensing area FR. For example, the fingerprint may be sensed by using only a size corresponding to the about a quarter of the touch sensing area TR as the fingerprint sensing area FR. Accordingly, the number of signal lines in the embodiments of FIGS. 10C and 10D may be reduced when compared with the number of the signal lines in the embodiment of FIGS. 10A and 10B in which half of the touch sensing area TR is used as the fingerprint sensing area FR. In the embodiment of FIG. 10D, the number of the first multiplexers, such as the first, third and fifth first multiplexer MX1-1, MX1-3, and MX1-5 and the number of the second multiplexers, such as the first and second second multiplexer MX2-4 and MX2-2, are smaller than those in the embodiment of FIG. 6A.

Figure 11:
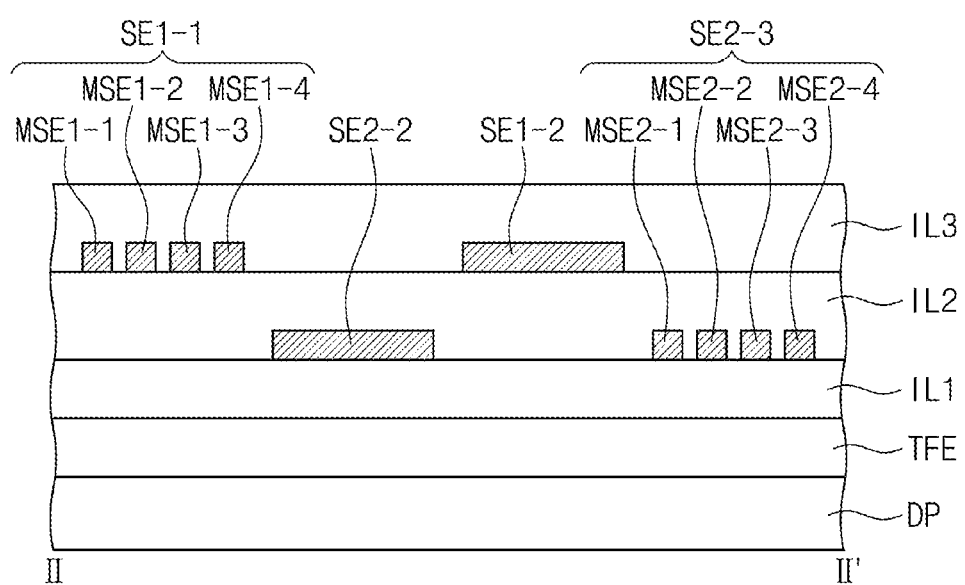
FIG. 11 is a cross-sectional view taken along line II-II' of FIG. 10C showing an input sensor according to an embodiment of the present inventive concepts.

FIG. 11 is a cross-sectional view showing the input sensor according to an embodiment of the present inventive concepts. FIG. 11 is a cross-sectional view taken along a line II-II' of FIG. 10C.

In the embodiment of FIG. 11, the first first sensing electrode SE1-1 includes the first to fourth first fine sensing electrodes MSE1-1 to MSE1-4, and the second first sensing electrode SE1-2 does not include the first fine sensing electrodes, such as the first to fourth first fine sensing electrodes MSE1-1 to MSE1-4. Similarly, the third second sensing electrode SE2-3 includes the first to fourth second fine sensing electrodes MSE2-1 to MSE2-4, and the second second sensing electrode SE2-2 does not include the second fine sensing electrodes, such as the first to fourth second fine sensing electrodes MSE2-4 to MSE2-4. When viewed in a plane, each of the first to fourth first fine sensing electrodes MSE1-1 to MSE1-4 and each of the first to fourth second fine sensing electrodes MSE2-4 to MSE2-4 may include the mesh lines and may have the mesh shape. Similarly, each of the second first sensing electrode SE1-2 and the second second sensing electrode SE2-2 may include the mesh lines and may have the mesh shape.

The first first sensing electrode SE1-1 and the third second sensing electrode SE2-3 are included in the fingerprint sensing area FR, and the second first sensing electrode SE1-2 and the second second sensing electrode SE2-2 are not included in the fingerprint sensing area FR.

Figure 12:
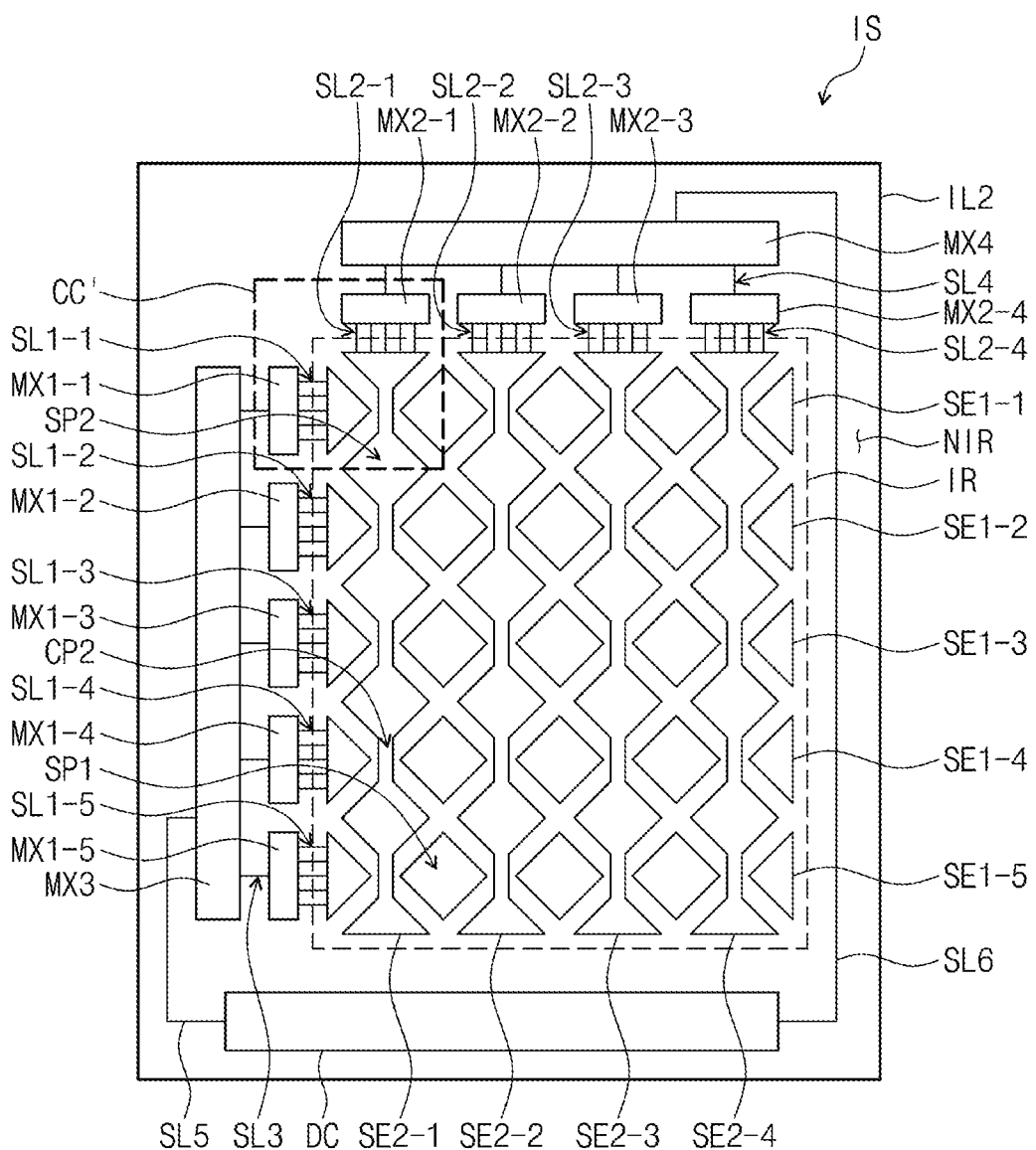
FIG. 12 is a plan view showing an input sensor according to an embodiment of the present inventive concepts.
Figure 12:
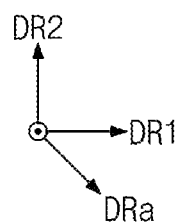
Figure 13A:
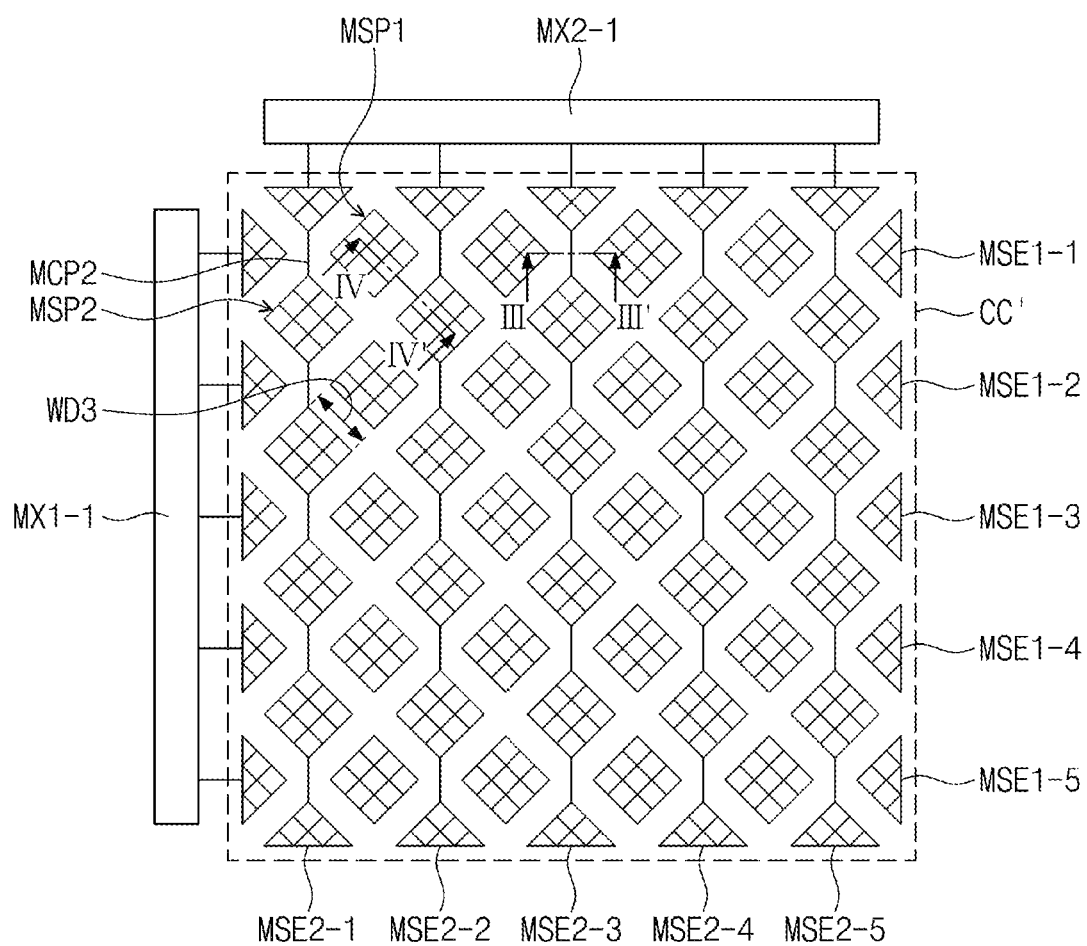
FIG. 13A is a plan view showing a plurality of fine sensing electrodes according to an embodiment of the present inventive concepts.
Figure 13B:
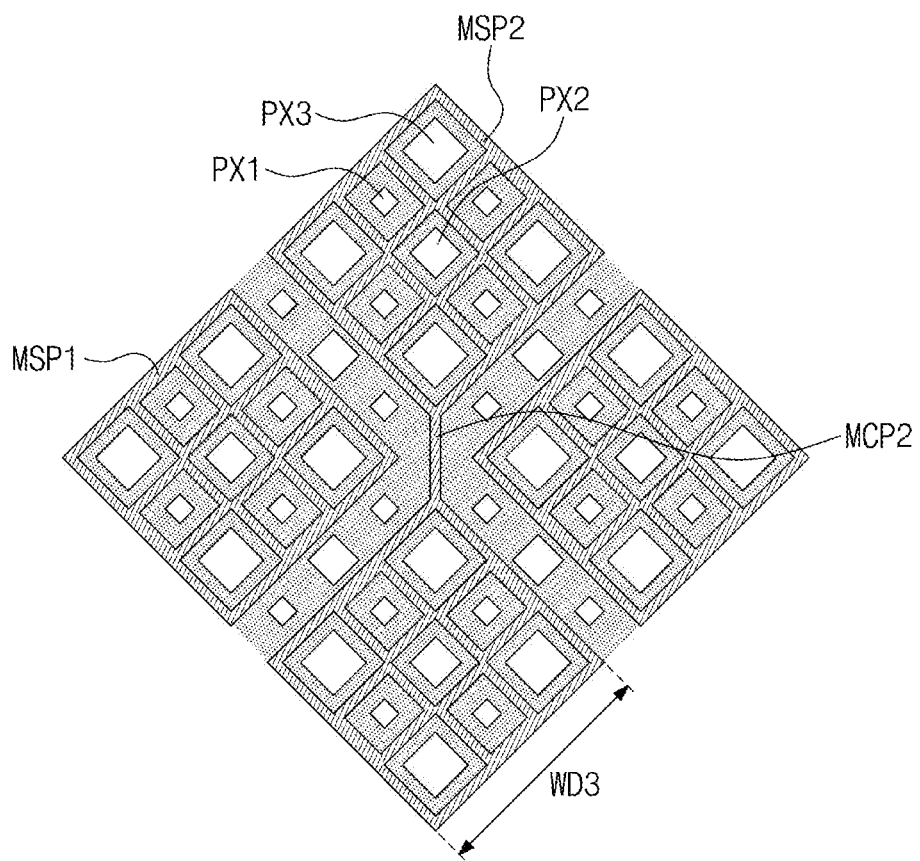
FIG. 13B is an enlarged plan view showing a plurality of fine sensing electrodes according to an embodiment of the present inventive concepts.
Figure 14:
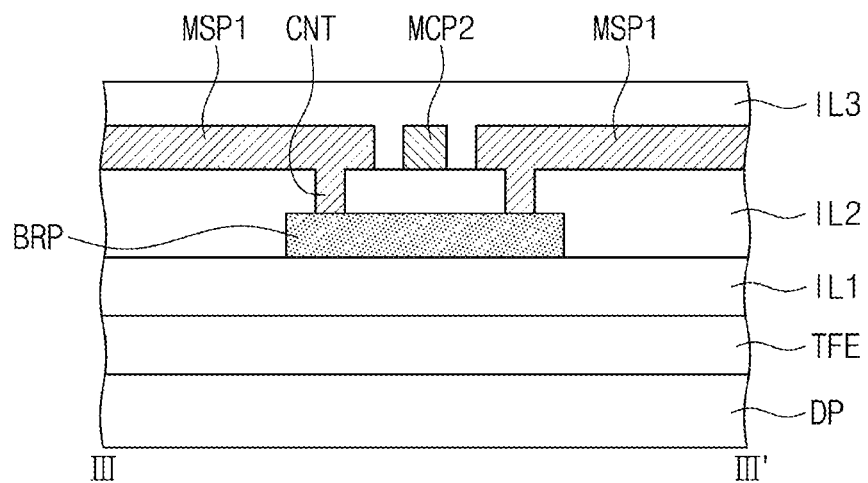
FIG. 14 is a cross-sectional views taken along line III-III' of FIG. 13A showing input sensors according to an embodiment of the present inventive concepts.
Figure 15:
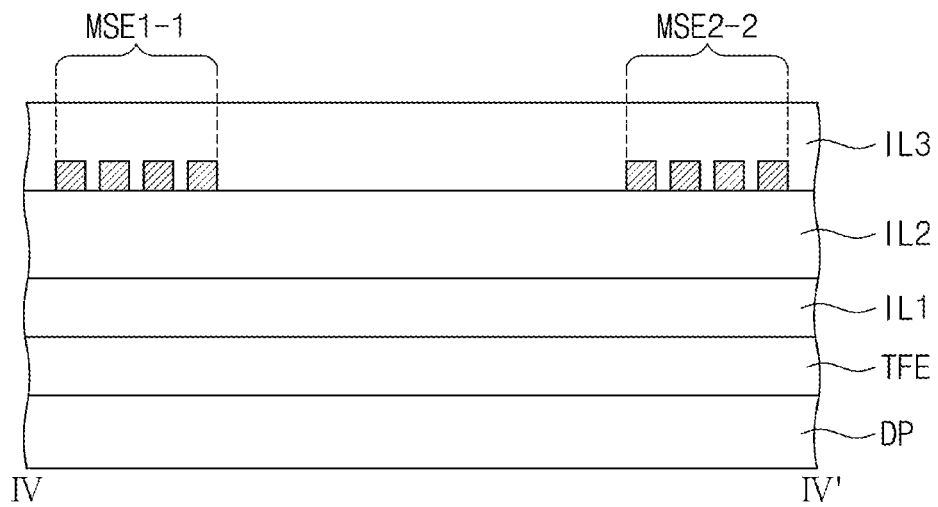
FIG. 15 is a cross-sectional views taken along line IV-IV' of FIG. 13A showing input sensors according to an embodiment of the present inventive concepts.

FIG. 12 is a plan view showing an input sensor IS according to an embodiment of the present inventive concepts. FIGS. 13A and 13B are views showing fine sensing electrodes according to embodiments of the present inventive concepts. FIGS. 14 and 15 are cross-sectional views showing the input sensor IS according to an embodiment of the present inventive concepts.

FIG. 14 is a cross-sectional view taken along a line III-III' of FIG. 13A, and FIG. 15 is a cross-sectional view taken along a line IV-IV' of FIG. 13A.

FIG. 12 is a view schematically showing the input sensor IS according to an embodiment of the present inventive concepts. In FIG. 12, first and second sensing electrodes SE1 and SE2 may include a plurality of fine sensing electrodes. The fine sensing electrodes are shown in the embodiment of FIG. 13A. In FIG. 12, the first to fifth first sensing electrodes SE1-1 to SE1-5 and the first to fourth second sensing electrodes SE2-1 to SE2-4 may be disposed on the same layer. For example, the first to fifth first sensing electrodes SE1-1 to SE1-5 and the first to fourth second sensing electrodes SE2-1 to SE2-4 may be disposed on a second insulating layer IL2.

FIG. 13A is an enlarged view showing an area CC' of FIG. 12. FIG. 13B is an enlarged view showing a partial portion of the fine sensing electrodes of the embodiment of FIG. 13A. The area CC' may correspond to one channel with respect to a touch sensing area.

In the embodiment of FIG. 13A, each of the first to fifth first sensing electrodes SE1-1 to SE1-5 may include a plurality of first fine sensing electrodes, such as the first to fifth first fine sensing electrodes MSE1-1 to MSE1-5. The first to fifth first fine sensing electrodes MSE1-1 to MSE1-5 may be connected to first first signal lines SL1-1. Each of the first to fourth second sensing electrodes SE2-1 to SE2-4 may include a plurality of first to fifth second fine sensing electrodes MSE2-1 to MSE2-5. The first to fifth second fine sensing electrodes MSE2-1 to MSE2-5 may be connected to first second signal lines SL2-1.

As shown in the embodiment of FIG. 13A, each of the first to fifth first fine sensing electrodes MSE1-1 to MSE1-5 may include a first fine portions MSP1 corresponding to a sensing portion. The first fine portions MSP1 may be connected to each other through a bridge pattern BRP (refer to FIG. 14). Each of the first to fifth second fine sensing electrodes MSE2-1 to MSE2-5 may include a plurality of second fine portions MSP2, which corresponds to the sensing portion, and fine connection portions MCP2 disposed between adjacent second fine portions MSP2 and connecting the second fine portions MSP2.

According to an embodiment, each of the first and second fine portions MSP1 and MSP2 may include a plurality of mesh lines that defines pixels arranged in a 3×3 matrix form. In an embodiment, each of the first and second fine portions MSP1 and MSP2 may have a width WD3 in a range of about 100 um to about 200 um.

In the embodiment of FIG. 13B, each of the first and second fine portions MSP1 and MSP2 surrounds a plurality of pixels. For example, in an embodiment, each of the first and second fine portions MSP1 and MSP2 may surround nine pixels arranged in a 3×3 matrix form. As shown in the embodiment of FIG. 13B, the pixels may include first, second, and third pixels PX1, PX2, and PX3 having a red color, a green color, and a blue color respectively. However, embodiments of the present inventive concepts are not limited thereto and the shape and color of the pixels may vary.

FIGS. 12, 13A, and 13B show the embodiment in which all of the first to fifth first sensing electrodes SE1-1 to SE1-5 and the first to fourth second sensing electrodes SE2-1 to SE2-4 include the plural fine sensing electrodes. However, embodiments of the present inventive concepts are not limited thereto. For example, referring to the embodiments of FIGS. 10A and 10C, in some embodiments only a partial portion of the first to fifth first sensing electrodes SE1-1 to SE1-5 and/or the first to fourth second sensing electrodes SE2-1 to SE2-4 include the plurality of fine sensing electrodes even though the first to fifth first sensing electrodes SE1-1 to SE1-5 and the first to fourth second sensing electrodes SE2-1 to SE2-4 are disposed on the same layer. In this embodiment, the first or second sensing electrodes SE1 or SE2 that do not include the fine sensing electrodes may have the width of about 4 mm.

Referring to FIGS. 14 and 15, the input sensor IS according to embodiments of the present inventive concepts may include a bridge pattern BRP. The bridge pattern BRP may correspond to a connection portion connecting the first fine portions MSP1 of the first to fifth first fine sensing electrodes MSE1-1 to MSE1-5 to each other. The bridge pattern BRP may be disposed on the first insulating layer IL1 and may be electrically connected to the first fine portions MSP1 through a contact hole CNT. For example, as shown in the embodiment of FIG. 14, a lower portion of the bridge pattern BRP may be disposed directly on the first insulating layer IL1. The first fine portions MSP1 may be disposed on the second insulating layer IL2 (e.g., directly on) and may be covered by a third insulating layer IL3. The third insulating layer IL3 may be a passivation layer. The fine connection portions MCP2 corresponding to the connection portion of the first to fifth second fine sensing electrodes MSE2-1 to MSE2-5 may be disposed between the first fine portions MSP1. The fine connection portions MCP2 may connect the second fine portions MSP2 that are the sensing portion of the first to fifth second fine sensing electrodes MSE2-1 to MSE2-5. The first and second fine sensing electrodes may have the mesh shape. As shown in the embodiment of FIG. 15, the first to fifth first fine sensing electrodes MSE1-1 to MSE1-5 (only the first first fine sensing electrodes MSE1-1 are shown) and the first to fifth second fine sensing electrodes MSE2-1 to MSE2-5 (only the second second fine sensing electrodes MSE2-2 are shown) may be disposed on the second insulating layer IL2.

Figure 16:
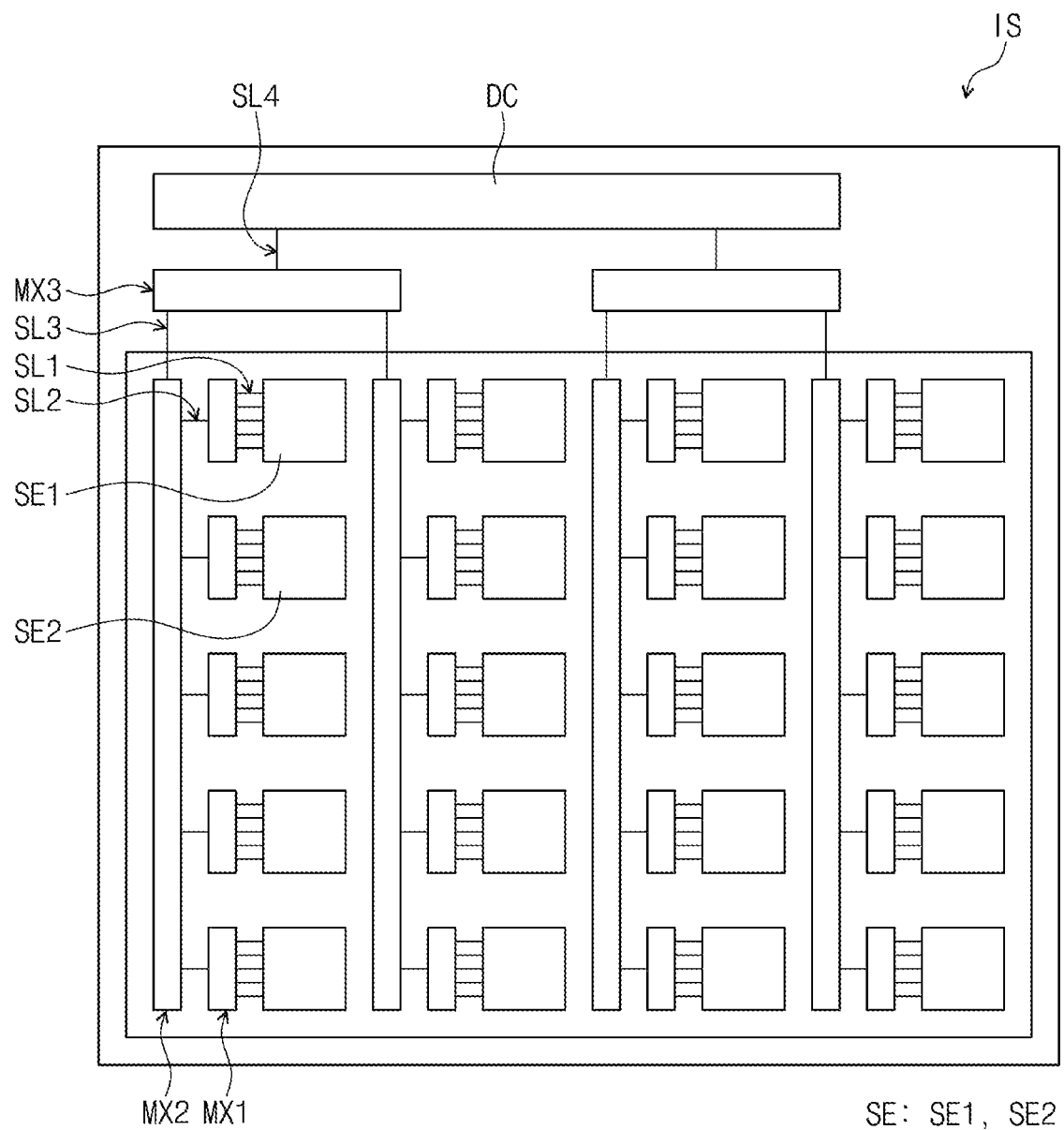
FIG. 16 is a plan view showing an input sensor according to an embodiment of the present inventive concepts.
Figure 17:
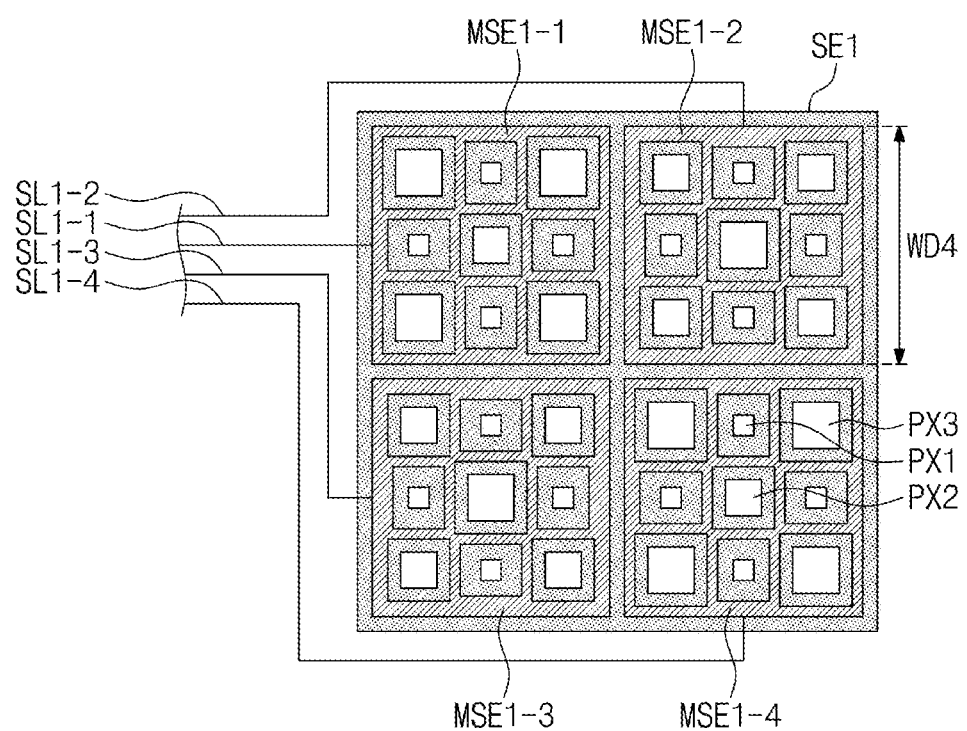
FIG. 17 is a plan view showing a plurality of fine sensing electrodes according to an embodiment of the present inventive concepts.

FIG. 16 is a plan view showing an input sensor according to an embodiment of the present inventive concepts. FIG. 16 shows the input sensor operated in a self-capacitance method. FIG. 17 is a plan view showing fine sensing electrodes according to an embodiment of the present inventive concepts.

Referring to the embodiment of FIG. 16, the input sensor IS may include a plurality of sensing electrodes, such as the first and second sensing electrodes SE1 and SE2. The sensing electrodes SE may have inherent coordinate information. For instance, the sensing electrodes SE may be arranged in a matrix form and may be respectively connected to the first signal lines SL1.

However, embodiments of the present inventive concepts are not limited to the shape and arrangement of the sensing electrodes SE shown in the embodiment of FIG. 16 and the shape and arrangement of the sensing electrodes SE may vary. A partial portion of the first signal lines SL1 may be disposed in the display area DA, and the remaining portion of the first signal lines SL1 may be disposed in the non-display area NDA. In an embodiment, the input sensor IS may obtain the coordinate information by the self-capacitance method. Each of the sensing electrodes SE, such as the first and second sensing electrodes SE1 and SE2, may include a plurality of fine sensing electrodes. For example, the sensing electrodes SE may include the first sensing electrode SE1 and the second sensing electrode SE2. The first sensing electrode SE1 may include a plurality of first fine sensing electrodes, such as first to fourth first fine sensing electrodes MSE1-1 to MSE1-4. FIG. 17 shows four first fine sensing electrodes, such as the first to fourth first fine sensing electrodes MSE1-1 to MSE1-4. However, embodiments of the present inventive concepts are not limited thereto and the number of the first fine sensing electrodes may be greater than four. Similar elements of the first fine sensing electrodes may correspond to those described with respect to the embodiments of FIGS. 6A to 13B and a repeated description may be omitted for convenience of explanation. The fine sensing electrodes may be respectively connected to the first signal lines SL1. The first signal lines SL1 may be connected to a first multiplexer MX1. A plurality of first multiplexers MX1 may be connected to a plurality of second multiplexers MX2 through a plurality of second signal lines SL2, and the second multiplexers MX2 may be connected to third multiplexers MX3 through third signal lines SL3. However, embodiments of the present inventive concepts are not limited thereto and the type and number of the multiplexers may vary, such as by being determined depending on the number of the fine sensing electrodes and the number of the signal lines. The third multiplexers MX3 may be connected to a driving circuit DC through a fourth signal lines SL4. For example, the sensing electrodes SE of the input sensor IS may be connected to the driving circuit DC through the first to fourth signal lines SL1 to SL4 connected to the first to third multiplexers MX1 to MX3.

The embodiment of FIG. 17 shows the first sensing electrode SE1 as a representative example. The first to fourth first fine sensing electrodes MSE1-1 to MSE1-4 may be respectively connected to the first to fourth first signal lines SL1-1 to SL1-4. The first to fourth first fine sensing electrodes MSE1-1 to MSE1-4 may have a mesh shape. In an embodiment, each of the first to fourth first fine sensing electrodes MSE1-1 to MSE1-4 may have a width WD4 in a range of about 100 um to about 200 um. In an embodiment, each of the first to fourth first fine sensing electrodes MSE1-1 to MSE1-4 may have a 3×3 matrix form. Each of the first to fourth first fine sensing electrodes MSE1-1 to MSE1-4 may include first, second, and third pixels PX1, PX2, and PX3 arranged in the 3×3 matrix form.

Figure 18:
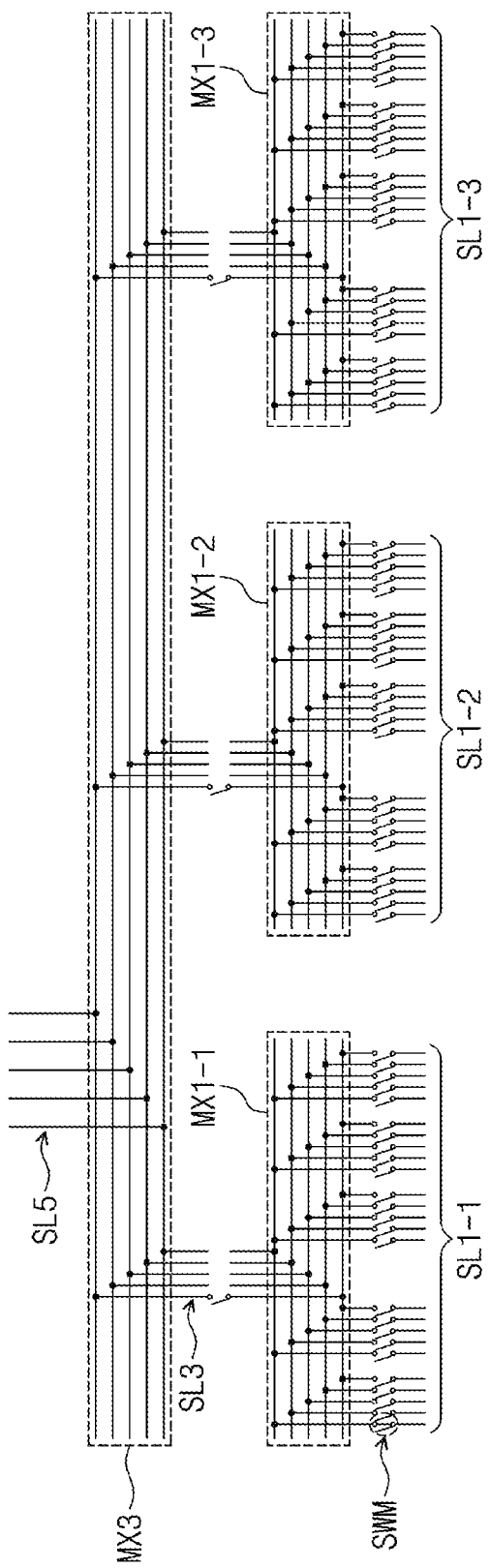
FIG. 18 is a plan view showing multiplexers according to an embodiment of the present inventive concepts.
Figure 19:
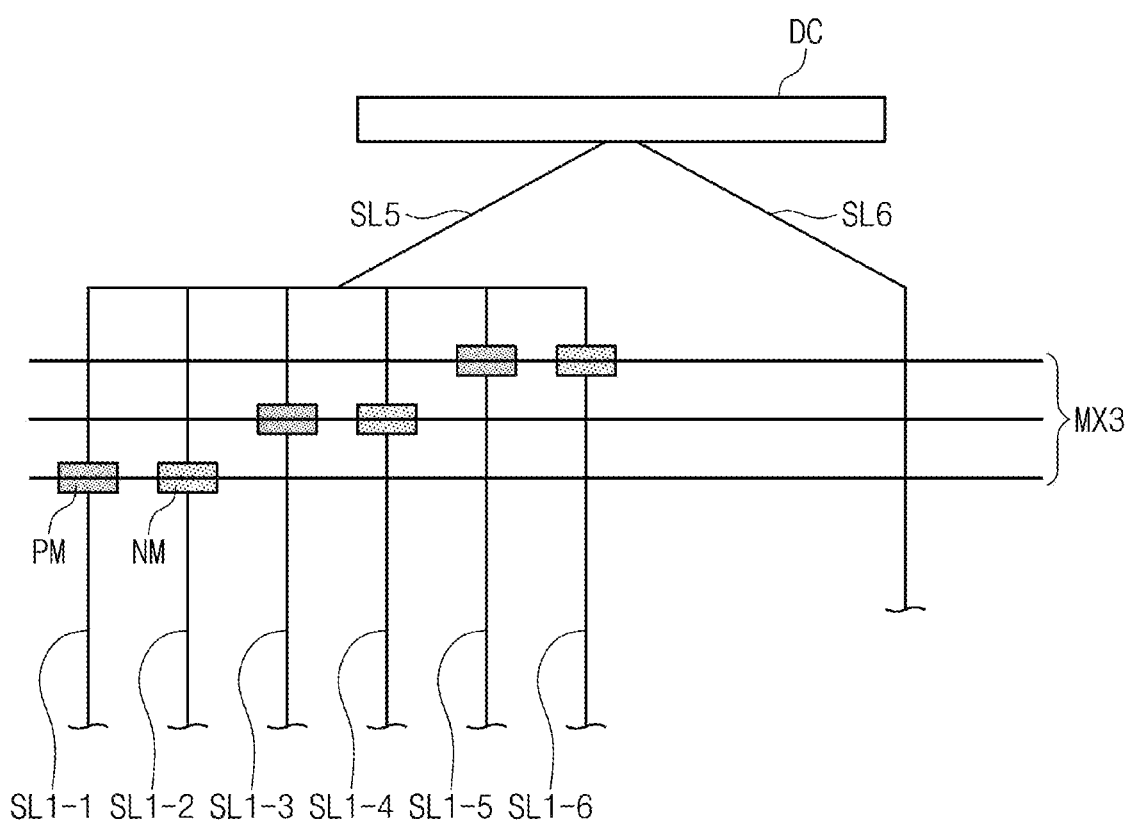
FIG. 19 is a plan view showing a multiplexer according to an embodiment of the present inventive concepts.

FIG. 18 is a plan view showing multiplexers according to an embodiment of the present inventive concepts. FIG. 19 is a plan view showing a multiplexer according to an embodiment of the present inventive concepts.

Referring to the embodiments of FIGS. 18 and 19, an electronic device according to an embodiment of the present inventive concepts may include a plurality of multiplexers. In an embodiment, sensing electrodes may include a plurality of fine sensing electrodes. The fine sensing electrodes may be respectively connected to signal lines. In this embodiment, the number of the signal lines may increase as the number of the fine sensing electrodes increases. The multiplexer may be provided in plural to process the increased signal lines. The fine sensing electrodes of the present inventive concepts may be used to sense the fingerprint, and since the fine sensing electrodes are provided to sense the ridge and valley of the fingerprint and may not be used to obtain accurate coordinates, the signal lines may be processed by the multiplexers.

In the embodiment of FIG. 18, each of first to third first signal lines SL1-1, SL1-2, and SL1-3 may include a plurality of signal lines. The first to third first signal lines SL1-1, SL1-2, and SL1-3 may be respectively connected to a plurality of first multiplexers, such as first to third first multiplexers MX1-1, MX1-2 and MX1-3. Each of the first to third first multiplexers MX1-1, MX1-2, and MX1-3 may be connected to a third signal line SL3. For example, the third signal line SL3 may be connected to the first to third first signal lines SL1-1, SL1-2, and SL1-3 through the first to third first multiplexers MX1-1, MX1-2, and MX1-3. The third signal line SL3 may be connected to a third multiplexer MX3. The third multiplexer MX3 may integrate a plurality of third signal lines SL3 into a fifth signal line SL5. Consequently, the fifth signal line SL5 may integrate a plurality of signal lines and may connect the signal lines to the driving circuit DC (see FIG. 6A).

As shown in the embodiment of FIG. 18, each of the first to third first signal lines SL1-1, SL1-2, and SL1-3 may include switches SWM. In an embodiment, each switch SWM may be an n-MOS or a p-MOS.

As shown in the embodiment of FIG. 18, each of the multiplexers includes a plurality of lines. For example, in the embodiment of FIG. 18, the third multiplexer MX3 includes five lines. FIG. 19 shows a third multiplexer MX3 according to another embodiment of the present inventive concepts. In the embodiment of FIG. 19, the third multiplexer MX3 may include only three lines. In an embodiment, a plurality of first signal lines, such as first to sixth first signal lines SL1-1 to SL1-6 may include different switches from each other. For example, in an embodiment, half of the first to sixth first signal lines SL1-1 to SL1-6 may include the p-MOS PM, and the other half of the first to sixth first signal lines SL1-1 to SL1-6 may include the n-MOS NM. For example, in an embodiment, a first first signal line SL1-1 may include the p-MOS PM, and a second first signal line SL1-2 may include the n-MOS NM. In this embodiment, the first first signal line SL1-1 and the second first signal line SL1-2 may be connected to the same line of the third multiplexer MX3. According to the embodiment shown in FIG. 19, the number of the lines included in the multiplexers may be cut in half.

In the embodiment of FIG. 19, a fifth signal line SL5 and a sixth signal line SL6 may be connected to the driving circuit DC. The fifth signal line SL5 may be connected to the first to sixth first signal lines SL1-1 to SL1-6, which are connected to the fine sensing electrodes of the fingerprint sensing area FR, through the third multiplexer MX3. The sixth signal line SL6 may be connected to the sensing electrode of the touch sensing area.

Although embodiments of the present inventive concepts have been described, it is understood that the present inventive concepts should not be limited to these embodiments but various changes and modifications can be made by one ordinary skilled in the art within the spirit and scope of the present inventive concepts. Therefore, the scope of the present inventive concepts should not be limited to any single embodiment described herein.

What is claimed is:

1. An electronic device comprising:
a display panel;
a window disposed on the display panel; and
an input sensor disposed between the display panel and the window, the input sensor including a first sensing electrode extending in a first direction and a second sensing electrode extending in a second direction crossing the first direction,
wherein at least a partial portion of each of the first sensing electrode and the second sensing electrode includes a plurality of fine sensing electrodes that is configured to be a fingerprint sensor, the plurality of fine sensing electrodes are comprised of the at least the partial portions of the first sensing electrode and the second sensing electrode that are cut along an extending direction of the first sensing electrode and the second sensing electrode, respectively,
wherein adjacent fine sensing electrodes of the plurality of fine sensing electrodes are separated from each other by a cutting line, and
wherein each of the first and second sensing electrodes has a width that is in a range of about 20 to about 40 times greater than a width of each of the plurality of fine sensing electrodes.

2. The electronic device of claim 1, wherein:
the window includes a thin film glass; and
the thin film glass has a thickness of about 30 micrometers or less.

3. The electronic device of claim 1, wherein:
the display panel includes a thin film encapsulation layer; and
the input sensor is disposed directly on the thin film encapsulation layer.

4. The electronic device of claim 1, wherein the display panel is a flexible display panel comprising a folding area and at least one non-folding area adjacent to the folding area.

5. The electronic device of claim 4, wherein at least a partial portion of the plurality of fine sensing electrodes overlap the folding area.

6. The electronic device of claim 1, wherein the input sensor further comprises:
a first insulating layer disposed on the display panel; and
a second insulating layer disposed on the first insulating layer,
wherein the second sensing electrode is disposed directly on the first insulating layer, and the first sensing electrode is disposed directly on the second insulating layer.

7. The electronic device of claim 6, wherein the second insulating layer has a thickness that is greater than a thickness of the first insulating layer.

8. The electronic device of claim 1, wherein the first sensing electrode and the second sensing electrode comprise a plurality of mesh lines.

9. The electronic device of claim 1, wherein the input sensor comprises:
a first signal line electrically connected to the first sensing electrode; and
a second signal line electrically connected to the second sensing electrode,
wherein at least a partial portion of each of the first signal line and the second signal line comprises a plurality of fine signal lines respectively connected to the plurality of fine sensing electrodes.

10. The electronic device of claim 9, further comprising a plurality of multiplexers respectively connected to the fine signal lines.

11. The electronic device of claim 10, wherein the multiplexers comprise:
a plurality of first multiplexers directly connected to the plurality of fine sensing electrodes; and
a second multiplexer connected to the plurality of first multiplexers,
wherein the second multiplexer is connected to a driving circuit that controls an operation of the input sensor and the fingerprint sensor.

12. The electronic device of claim 1, wherein:
the input sensor comprises a touch sensing area and a fingerprint sensing area defined by the first sensing electrode and the second sensing electrode,
wherein the fingerprint sensing area is defined by the plurality of fine sensing electrodes crossing each other.

13. The electronic device of claim 1, wherein a half of the first sensing electrode comprises a plurality of first fine sensing electrodes, a half of the second sensing electrode comprises a plurality of second fine sensing electrodes, and the plurality of first fine sensing electrodes cross the plurality of second fine sensing electrodes.

14. An electronic device comprising:
a display panel;
a first insulating layer disposed on the display panel;
a second insulating layer disposed on the first insulating layer; and
an input sensor disposed directly on the second insulating layer and including a first sensing electrode extending in a first direction and a second sensing electrode extending in a second direction crossing the first direction,
wherein at least a partial portion of each of the first sensing electrode and the second sensing electrode includes a plurality of fine sensing electrodes that is configured to be a fingerprint sensor, the plurality of fine sensing electrodes are comprised of the at least the partial portions of the first sensing electrode and the second sensing electrode that are cut along an extending direction of the first sensing electrode and the second sensing electrode, respectively,
wherein adjacent fine sensing electrodes of the plurality of fine sensing electrodes are separated from each other by a cutting line, and
wherein each of the first and second sensing electrodes has a width that is in a range of about 20 to about 40 times greater than a width of each of the plurality of fine sensing electrodes.

15. The electronic device of claim 14, wherein the fingerprint sensor is operated in a capacitive method.

16. The electronic device of claim 14, wherein:
the plurality of fine sensing electrodes included in the at least a partial portion of the first sensing electrode comprises a plurality of first fine sensing electrodes; and
the plurality of fine sensing electrodes included in the at least a partial portion of the second sensing electrode comprises a plurality of second fine sensing electrodes.

17. The electronic device of claim 14, wherein the width of each of the plurality of fine sensing electrodes is substantially the same as a distance between ridges of a fingerprint.

18. The electronic device of claim 14, wherein the first sensing electrode has an area that is substantially the same as a sum of areas of the plurality of fine sensing electrodes included in the first sensing electrode.

19. The electronic device of claim 14, wherein:
the first sensing electrode and the second sensing electrode are configured to be a touch sensor that senses a touch input in the input sensor;
a half of each of the first sensing electrode and the second sensing electrode is configured to be both the touch sensor and the fingerprint sensor, and
the fingerprint sensor comprises fine sensing electrodes of the plurality of fine sensing electrodes that cross each other.

20. An electronic device comprising:
a display panel;
a window disposed on the display panel and comprising a thin film glass; and
an input sensor disposed between the display panel and the window, the input sensor comprising:
a plurality of sensing electrodes;
a plurality of signal lines respectively connected to the plurality of sensing electrodes; and
a plurality of multiplexers connecting the plurality of signal lines,
wherein at least a partial portion of the plurality of sensing electrodes comprises a plurality of fine sensing electrodes that is configured to be a fingerprint sensor, the plurality of fine sensing electrodes are comprised of the at least the partial portion of the plurality of sensing electrodes that is cut along an extending direction of the plurality of sensing electrodes, respectively,
wherein adjacent fine sensing electrodes of the plurality of fine sensing electrodes are separated from each other by a cutting line, and
wherein each of the plurality of sensing electrodes has a width that is in a range of about 20 to about 40 times greater than a width of each of the plurality of fine sensing electrodes.

21. An electronic device comprising:
a display panel;
a window disposed on the display panel; and
an input sensor disposed between the display panel and the window, the input sensor including a first sensing electrode extending in a first direction and a second sensing electrode extending in a second direction crossing the first direction,
wherein a partial portion of the first sensing electrode and the second sensing electrode includes a plurality of fine sensing electrodes having a first width and a remaining portion of the first sensing electrode and the second sensing electrode includes sensing electrodes have a second width in a range of about twenty to about forty times greater than the first width,
wherein the plurality of fine sensing electrodes are comprised of the at least the partial portions of the first sensing electrode and the second sensing electrode that are cut along an extending direction of the first sensing electrode and the second sensing electrode, respectively,
wherein adjacent fine sensing electrodes of the plurality of fine sensing electrodes are separated from each other by a cutting line.

* * * * *